US012799246B2

(12) United States Patent
Malinski et al.

(10) Patent No.: US 12,799,246 B2
(45) Date of Patent: Nov. 17, 2026

(54) POLYALPHAOLEFINS MADE FROM DIMER OLEFINS OBTAINED FROM BRANCHED $C_{10}$ MONOOLEFINS USING ALKYL ALUMINUM CATALYST

(71) Applicant: Chevron Phillips Chemical Company LP, The Woodlands, TX (US)

(72) Inventors: Thomas Malinski, Porter, TX (US); Spencer A. Kerns, Houston, TX (US); Julie A. Leseberg, Kingwood, TX (US); Jeffrey C. Gee, Kingwood, TX (US); Steven M. Bischof, Spring, TX (US); James Hillier, Porter, TX (US); Michael S. Webster-Gardiner, Humble, TX (US)

( * ) Notice: Subject to any disclaimer, the term of this patent is extended or adjusted under 35 U.S.C. 154(b) by 496 days.

(21) Appl. No.: 18/457,075

(22) Filed: Aug. 28, 2023

(65) Prior Publication Data

US 2025/0075015 A1 Mar. 6, 2025

(51) Int. Cl.

*C08F 210/14* (2006.01)
*C08F 4/52* (2006.01)
*C08F 8/04* (2006.01)
*C08F 210/16* (2006.01)

(52) U.S. Cl.

CPC .............. *C08F 210/14* (2013.01); *C08F 4/52* (2013.01); *C08F 8/04* (2013.01); *C08F 210/16* (2013.01)

(58) Field of Classification Search

CPC ....... C07C 11/02; C07C 2/30; C07C 2531/14; C07C 5/03; C07C 9/22; C08F 210/14; C08F 210/16; C08F 4/52; C08F 8/04

See application file for complete search history.

(56) References Cited

U.S. PATENT DOCUMENTS

| | | | | |
|---|---|---|---|---|
| 5,573,657 | A | 11/1996 | Degnan | |
| 5,689,028 | A | 11/1997 | Lashier | |
| 8,049,052 | B2 | 11/2011 | Kreischer | |
| 8,344,198 | B2 | 1/2013 | Ewert | |
| 10,647,626 | B2 * | 5/2020 | Coffin | C07C 2/12 |
| 10,927,052 | B2 * | 2/2021 | Coffin | C07C 2/26 |
| 11,174,205 | B2 | 11/2021 | Gee | |
| 11,186,530 | B2 | 11/2021 | Gee | |
| 2018/0016204 | A1 * | 1/2018 | Coffin | C07C 2/26 |
| 2018/0127332 | A1 * | 5/2018 | Kreischer | C07C 2/34 |
| 2021/0323892 | A1 | 10/2021 | Gee | |

FOREIGN PATENT DOCUMENTS

| | | | |
|---|---|---|---|
| WO | 2017010998 | A1 | 1/2017 |
| WO | 2018013249 | A1 | 1/2018 |

OTHER PUBLICATIONS

International Search Report and Written Opinion issued in corresponding PCT Application No. PCT/US2024/042058, completed on Nov. 28, 2024.
International Search Report and Written Opinion issued in corresponding PCT Application No. PCT/US2024/042058, mailed on Dec. 13, 2024, 11 pp.
Sequeira, Lubricant Base Oil and Wax Processing, p. 119-154, 1994.

* cited by examiner

*Primary Examiner* — Ana L. Woodward
(74) *Attorney, Agent, or Firm* — Keith C. Rawlins, Esq.; Scheef & Stone, L.L.P.

(57) ABSTRACT

Synthesis of polyalphaolefins by oligomerization of one or more branched $C_{10}$ monoolefins with an alkyl aluminum catalyst to form an oligomer product, followed by hydrogenation of a $C_{20+}$ olefin portion of the oligomer product to form the polyalphaolefins. The alkyl aluminum catalyst is selective to $C_{20}$ olefin dimers.

16 Claims, 1 Drawing Sheet

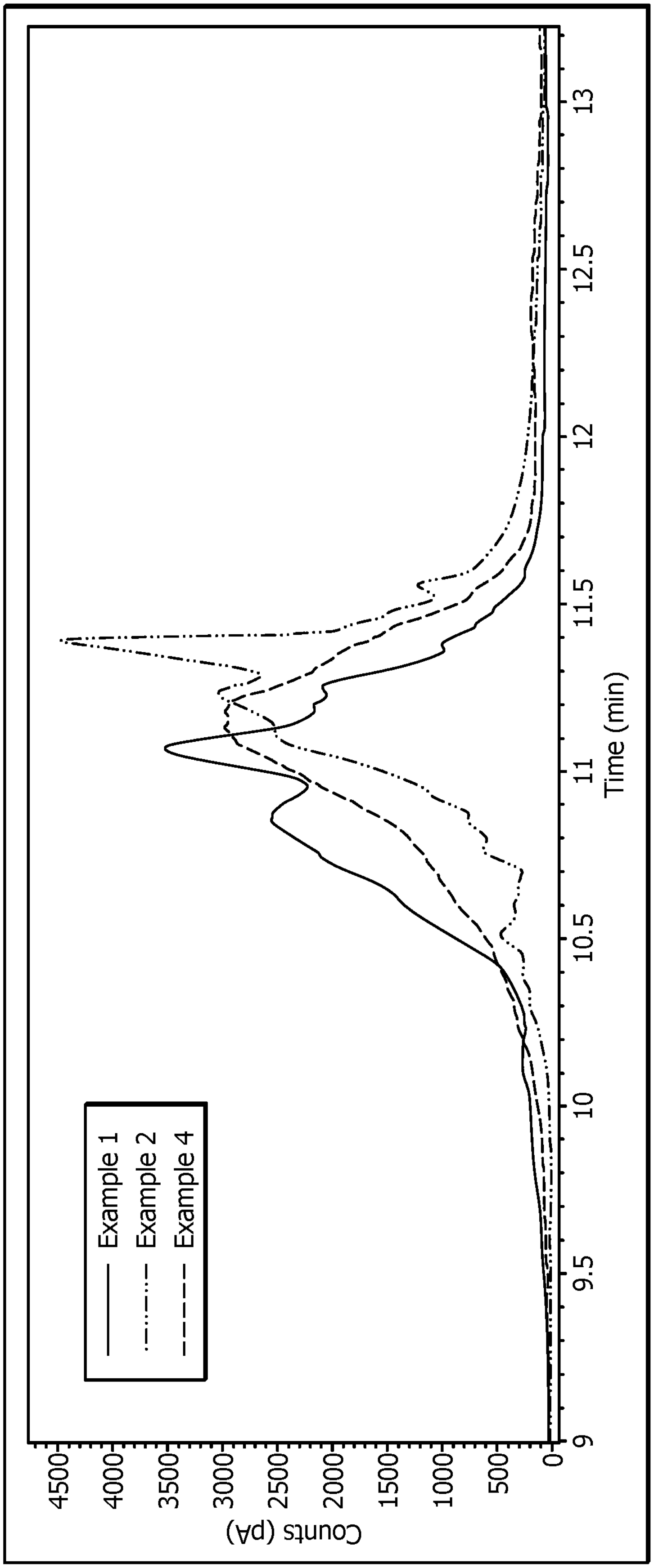
Counts (pA)
4500
4000
3500
3000
2500
2000
1500
1000
500
0
9
9.5
10
10.5
11
11.5
12
12.5
13
Time (min)
Example 1
Example 2
Example 4

POLYALPHAOLEFINS MADE FROM DIMER OLEFINS OBTAINED FROM BRANCHED $C_{10}$ MONOOLEFINS USING ALKYL ALUMINUM CATALYST

FIELD OF THE DISCLOSURE

The present disclosure generally relates to polyalphaolefins, and more particularly to the synthesis of polyalphaolefins from dimer olefins that are obtained from branched $C_{10}$ monoolefins.

BACKGROUND

Compound 1-decene can be used as starting material to produce polyalphaolefins. High demand for 1-decene increases the cost for the synthesis of polyalphaolefins that depend on 1-decene as the starting material. Moreover, manufacturers of polyalphaolefin products are under pressure to produce more polyalphaolefin products to meet rising demand. Polyalphaolefin production can be increased by using 1-octene and 1-dodocene in combination with 1-decene to make a mixed polyalphaolefin product. There is ongoing need for techniques that can produce polyalphaolefins from starting materials other than 1-decene.

SUMMARY

Disclosed is a process including: contacting a composition including one or more branched $C_{10}$ monoolefins with an alkyl aluminum catalyst to produce an oligomer product including unreacted $C_{10}$ monoolefins and $C_{20}$ olefin dimers, wherein the one or more branched $C_{10}$ monoolefins include 2-butyl-1-hexene, 3-propyl-1-heptene, 4-ethyl-1-octene, and 5-methyl-1-nonene; separating the oligomer product into an unreacted $C_{10}$ portion including the unreacted $C_{10}$ monoolefins and a $C_{20+}$ olefin portion including the $C_{20}$ olefin dimers; and hydrogenating the $C_{20+}$ olefin portion to form polyalphaolefins including saturated $C_{20}$ hydrocarbons.

Disclosed is a composition including polyalphaolefins, wherein the polyalphaolefins include 2-(3-methylheptyl)-7-methyl-1-undecane, 2-(4-octyl)-7-methyl-1-undecane, 2-(3-methylheptyl)-5-propyl-1-nonane, 2-(2-ethylhexyl)-7-methyl-1-undecane, 2-(3-methylheptyl)-6-ethyl-1-decane, or combinations thereof.

Disclosed is a method of using a polyalphaolefin disclosed herein, wherein the method includes using the polyalphaolefin as a thermal management fluid.

Disclosed is a method of using a polyalphaolefin disclosed herein, wherein the method includes using the polyalphaolefin as a metal working fluid.

Disclosed is a method of using a polyalphaolefin disclosed herein, wherein the method includes using the polyalphaolefin as a lubrication fluid.

Disclosed is a method of using a polyalphaolefin disclosed herein, wherein the method includes using the polyalphaolefin as a hydraulic fluid.

Disclosed is a method of using a polyalphaolefin disclosed herein, wherein the method includes using the polyalphaolefin as a drilling and/or fracturing fluid.

Disclosed is a method of using a polyalphaolefin disclosed herein, wherein the method includes using the polyalphaolefin as a dielectric cooling fluid for immersion cooling of electronic and/or computer devices.

Other technical features may be readily apparent to one skilled in the art from the following FIGURE, descriptions and claims.

BRIEF DESCRIPTION OF THE DRAWINGS

For a more complete understanding of this disclosure, reference is now made to the following description, taken in conjunction with the accompanying drawings, in which:

The FIGURE illustrates a gas chromatogram of a polyalphaolefin product prepared using a solid acid catalyst in the dimerization step, a polyalphaolefin product prepared using an alkyl aluminum catalyst in the dimerization step, and a polyalphaolefin product prepared using a boron trifluoride ($BF_3$) catalyst in the dimerization step.

DETAILED DESCRIPTION

To define more clearly the terms used herein, the following definitions are provided. Unless otherwise indicated, the following definitions are applicable to this disclosure. If a term is used in this disclosure, but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the Periodic Table are indicated using the numbering scheme indicated in the version of the Periodic Table of elements published in Chemical and Engineering News, 63 (5), 27, 1985. In some instances, a group of elements can be indicated using a common name assigned to the group; for example, alkali metals for Group 1 elements, alkaline earth metals (or alkaline metals) for Group 2 elements, transition metals for Groups 3-12 elements, and halogens for Group 17 elements.

Regarding claim transitional terms or phrases, the transitional term “comprising”, which is synonymous with “including,” “containing,” “having,” or “characterized by,” is inclusive or open-ended and does not exclude additional, unrecited elements or method steps. The transitional phrase “consisting of” excludes any element, step, or ingredient not specified in the claim. The transitional phrase “consisting of” limits the scope of a claim to the specified materials or steps and those that do not materially affect the basic and novel characteristic(s) of the claimed invention. The term “consisting essentially of” occupies a middle ground between closed terms like “consisting of” and fully open terms like “comprising.” Absent an indication to the contrary, when describing a compound or composition, “consisting essentially of” is not to be construed as “comprising,” but is intended to describe the recited component that includes materials which do not significantly alter the composition or method to which the term is applied. For example, a composition consisting essentially of a material A can include impurities typically present in a commercially produced or commercially available sample of the recited compound or composition. When a claim includes different features and/or feature classes (for example, a method step, composition features, and/or product features, among other possibilities), the transitional terms comprising, consisting essentially of, and consisting of apply only to the feature class which is utilized and it is possible to have different transitional terms or phrases utilized with different features within a claim. For example, a method can comprise several recited steps (and other non-recited steps), but utilize a catalyst system preparation consisting of specific steps, or alternatively, consisting essentially of specific steps, but utilize a catalyst system comprising recited components and other non-recited components.

While compositions and methods are described in terms of "comprising" (or other broad term) various components and/or steps, the compositions and methods can also be described using narrower terms, such as "consist essentially of" or "consist of" the various components and/or steps.

The terms "a," "an," and "the" are intended, unless specifically indicated otherwise, to include plural alternatives, e.g., at least one.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers, unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers, whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

A chemical "group" is described according to how that group is formally derived from a reference or "parent" compound, for example, by the number of hydrogen atoms formally removed from the parent compound to generate the group, even if that group is not literally synthesized in this manner. By way of example, an "alkyl group" can formally be derived by removing one hydrogen atom from an alkane, while an "alkylene group" can formally be derived by removing two hydrogen atoms from an alkane. Moreover, a more general term can be used to encompass a variety of groups that formally are derived by removing any number ("one or more") of hydrogen atoms from a parent compound, which in this example can be described as an "alkane group," and which encompasses an "alkyl group," an "alkylene group," and materials having three or more hydrogens atoms, as necessary for the situation, removed from the alkane. Throughout, the disclosure of a substituent, ligand, or other chemical moiety that can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon. Non-limiting examples of hydrocarbyl groups include ethyl, phenyl, tolyl, propenyl, and the like. Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene, alkyl, alkylene, alkane, cycloalkyl, cycloalkylene, cycloalkane, aralkyl, aralkylene, and aralkane groups, among other groups, as members.

The term "alkane" whenever used in this specification and claims refers to a saturated hydrocarbon compound. Other identifiers can be utilized to indicate the presence of particular groups in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic groups, and/or can be linear or branched unless otherwise specified. Primary, secondary, and tertiary alkyl group are derived by removal of a hydrogen atom from a primary, secondary, and tertiary carbon atom, respectively, of an alkane. The n-alkyl group can be derived by removal of a hydrogen atom from a terminal carbon atom of a linear alkane.

An aliphatic compound is an acyclic or cyclic, saturated or unsaturated carbon compound, excluding aromatic compounds. Thus, an aliphatic compound is an acyclic or cyclic, saturated or unsaturated carbon compound, excluding aromatic compounds; that is, an aliphatic compound is a non-aromatic organic compound. An "aliphatic group" is a generalized group formed by removing one or more hydrogen atoms (as necessary for the particular group) from a carbon atom of an aliphatic compound. Thus, an aliphatic compound is an acyclic or cyclic, saturated or unsaturated carbon compound, excluding aromatic compounds. That is, an aliphatic compound is a non-aromatic organic compound. Aliphatic compounds and therefore aliphatic groups can contain organic functional group(s) and/or atom(s) other than carbon and hydrogen.

The term "substituted" when used to describe a compound or group, for example, when referring to a substituted analog of a particular compound or group, is intended to describe any non-hydrogen moiety that formally replaces a hydrogen in that group, and is intended to be non-limiting. A group or groups can also be referred to herein as "unsubstituted" or by equivalent terms, such as "non-substituted," which refers to the original group in which a non-hydrogen moiety does not replace a hydrogen within that group. "Substituted" is intended to be non-limiting and include inorganic substituents or organic substituents.

The term "olefin" whenever used in this specification and claims refers to hydrocarbons that have at least one carbon-carbon double bond that is not part of an aromatic ring or an aromatic ring system. The term "olefin" includes aliphatic and aromatic, cyclic and acyclic, and/or linear and branched hydrocarbons having at least one carbon-carbon double bond that is not part of an aromatic ring or ring system unless specifically stated otherwise. Olefins having only one, only two, only three, etc., carbon-carbon double bonds can be identified by use of the term "mono," "di," "tri," etc., within the name of the olefin. The olefins can be further identified by the position of the carbon-carbon double bond(s).

The term "alkene" whenever used in this specification and claims refers to a linear or branched aliphatic hydrocarbon olefin that has one or more carbon-carbon double bonds. Alkenes having only one, only two, only three, etc., such multiple bonds can be identified by use of the term "mono," "di," "tri," etc., within the name. For example, alkamonoenes, alkadienes, and alkatrienes refer to linear or branched acyclic hydrocarbon olefins having only one carbon-carbon double bond (acyclic having a general formula of CnH2n), only two carbon-carbon double bonds (acyclic having a general formula of CnH2n-2), and only three carbon-carbon double bonds (acyclic having a general formula of CnH2n-4), respectively. Alkenes can be further identified by the position of the carbon-carbon double bond(s). Other identifiers can be utilized to indicate the presence or absence of particular groups within an alkene. For example, a haloalkene refers to an alkene having one or more hydrogen atoms replaced with a halogen atom.

The term "alpha olefin" as used in this specification and claims refers to an olefin that has a carbon-carbon double bond between the first and second carbon atoms of the longest contiguous chain of carbon atoms. The term "alpha olefin" includes linear and branched alpha olefins unless expressly stated otherwise. In the case of branched alpha olefins, a branch can be at the 2 position (a vinylidene) and/or the 3 position or higher with respect to the olefin double bond. The term "vinylidene" whenever used in this specification and claims refers to an alpha olefin having a branch at the 2 position with respect to the olefin double bond. By itself, the term "alpha olefin" does not indicate the presence or absence of other carbon-carbon double bonds unless explicitly indicated.

The terms "room temperature" or "ambient temperature" are used herein to describe any temperature from 15° C. to 35° C., wherein no external heat or cooling source is directly applied to the reaction vessel. Accordingly, the terms "room temperature" and "ambient temperature" encompass the individual temperatures and any and all ranges, subranges, and combinations of subranges of temperatures from 15° C. to 35° C., wherein no external heating or cooling source is directly applied to the reaction vessel. The term "atmospheric pressure" is used herein to describe an earth air pressure wherein no external pressure modifying means is utilized. Generally, unless practiced at extreme earth altitudes, "atmospheric pressure" is about 1 atmosphere (alternatively, about 14.7 psi or about 101 kPa).

Features within this disclosure that are provided as a minimum value can be alternatively stated as "at least" or "greater than or equal to" any recited minimum value for the feature disclosed herein. Features within this disclosure that are provided as a maximum value can be alternatively stated as "less than or equal to" or "below" any recited maximum value for the feature disclosed herein.

Within this disclosure, the normal rules of organic nomenclature will prevail. For instance, when referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions. References to compounds or groups having substitutions at positions in addition to the indicated position will be referenced using comprising or some other alternative language. For example, a reference to a phenyl group comprising a substituent at the 4 position refers to a phenyl group having a non-hydrogen substituent group at the 4 position and hydrogen or any non-hydrogen group at the 2, 3, 5, and 6 positions.

Use of the term "optionally" with respect to any element of a claim is intended to mean that the subject element is required, or alternatively, is not required. Both alternatives are intended to be within the scope of the claim.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms. Moreover, other identifiers or qualifying terms can be utilized to indicate the presence or absence of a particular substituent, a particular regiochemistry and/or stereochemistry, or the presence or absence of a branched underlying structure or backbone.

Processes and/or methods described herein utilize steps, features, and compounds which are independently described herein. The process and methods described herein may or may not utilize step identifiers (e.g., 1), 2), etc., a), b), etc., or i), ii), etc.), features (e.g., 1), 2), etc., a), b), etc., or i), ii), etc.), and/or compound identifiers (e.g., first, second, etc.). However, it should be noted that processes and/or methods described herein can have multiple steps, features (e.g., reagent ratios, formation conditions, among other considerations), and/or multiple compounds having the same general descriptor. Consequently, it should be noted that the processes and/or methods described herein can be modified to use an appropriate step or feature identifier (e.g., 1), 2), etc., a), b), etc., or i), ii), etc.) and/or compound identifier (e.g., first, second, etc.) regardless of step, feature, and/or compound identifier utilized in a particular aspect and/or embodiment described herein and that step or feature identifiers can be added and/or modified to indicate individual different steps/features/compounds utilized within the process and/or methods without detracting from the general disclosure.

Embodiments disclosed herein can provide the materials listed as suitable for satisfying a particular feature of the embodiment delimited by the term "or." For example, a particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

The weight percent compositional aspects of the various compositions described herein (e.g., the weight percent of one or more compounds present in a composition) can be determined by gas chromatography (GC), gas chromatography-mass spectroscopy (GC-MS), Raman spectroscopy, nuclear magnetic resonance (NMR) spectroscopy, or any other suitable analytical method known to those of skill in the art. For example, unless otherwise indicated, the weight percent compositional aspects of the various compositions described herein (e.g., the weight percent of the various olefins and saturated hydrocarbons such as $C_{20}$ olefin dimer and saturated $C_{20}$ hydrocarbons present in the compositions such as the crude, light fraction, intermediate fraction, heavy faction, etc.) can be determined using a gas chromatograph with a flame ionization detector (GC-FID) detector based on the total GC peak areas (as described herein) and reported as gas chromatography (GC) area percent (GC area %), which is a common analytical technique for compositions comprising sulfur-containing compounds. While not wishing to be bound by this theory, it is believed that the amount in area % is very similar to the amount in weight percent (wt %), and these respective amounts need not be exactly equivalent or interchangeable in order to be understood by a person of ordinary skill.

It has been found that a polyalphaolefin product can be made by oligomerizing one or more branched $C_{10}$ monoolefins and then hydrogenating $C_{20}$ olefin dimers formed by the oligomerization to form the polyalphaolefin product. The polyalphaolefin product, also referred to as the hydrogenated oligomer product, can have properties similar to the properties of commercially available polyalphaolefins synthesized from linear 1-decene. Branched 1-decenes are oligomerized to form olefin dimers, and the olefin dimers are then hydrogenated to form a $C_{20}$ polyalphaolefin product.

Contacting $C_{10}$ IO Composition for Oligomerization

Disclosed herein is a process comprising contacting a composition comprising one or more branched $C_{10}$ monoolefins with a catalyst to produce an oligomer product comprising unreacted $C_{10}$ monoolefins and $C_{20}$ olefin dimers.

Composition Comprising One or More Branched $C_{10}$ Monoolefins

The composition can include the one or more branched $C_{10}$ monoolefins. In aspects, the one or more branched $C_{10}$ monoolefins can include 5-methyl-1-nonene (represented by Structure 1), 3-propyl-1-heptene (represented by Structure 2), 4-ethyl-1-octene (represented by Structure 3), 2-butyl-1-hexene (represented by Structure 4), or combinations thereof.

Structure 1

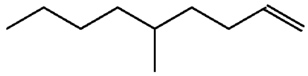

Structure 2

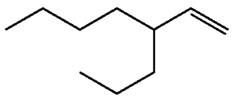

-continued

Structure 3

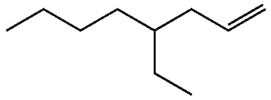

Structure 4

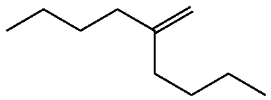

Any composition comprising one or more branched $C_{10}$ monoolefins of the type described herein can be used, for example a composition obtained from a commercial petroleum refining or petrochemical process. Such compositions can comprise other olefins in addition to the one or more branched $C_{10}$ monoolefins of the type described herein, for example linear $C_{10}$ monoolefins, as well as olefins having more or fewer than 10 carbon atoms. In aspects, the composition comprises one or more branched $C_{10}$ monoolefins and is obtained from a 1-hexene production process effluent stream. In various embodiments, a composition obtained from a 1-hexene production process effluent stream can comprise $C_{10}$ monoolefins (e.g., branched and/or linear $C_{10}$ monoolefins) as well as olefins having more or fewer than 10 carbon atoms.

In aspects, the composition can comprise (a) at least about 76 mol %, alternatively at least about 78 mol %, alternatively at least about 80 mol %, or alternatively at least about 82 mol % $C_{10}$ monoolefins, and (b) at least about 1 mol %, alternatively at least about 2 mol %, alternatively at least about 3 mol %, or alternatively at least about 4 mol % $C_{14}$ monoolefins. In aspects, the composition can comprise (a) from about 76 mol % to about 92 mol %, alternatively from about 78 mol % to about 90 mol %, alternatively from about 80 mol % to about 88 mol %, or alternatively from about 82 mol % to about 86 mol % $C_{10}$ monoolefins; and (b) from about 1 mol % to about 12 mol %, alternatively from about 2 mol % to about 10 mol %, alternatively from about 3 mol % to about 8 mol %, or alternatively from about 4 mol % to about 7 mol % $C_{14}$ monoolefins. In aspects, the composition is obtained from a 1-hexene production process effluent stream, for example an effluent stream obtained from a 1-hexene production process of the type disclosed in WIPO International Publication No. WO/2017/010998, which is incorporated by reference herein in its entirety.

In another embodiment, the composition can comprise at least about 95 mol %, alternatively at least about 96 mol %, alternatively at least about 97 mol %, alternatively at least about 98 mol %, or alternatively at least about 99 mol % $C_{10}$ monoolefins. In aspects, the composition can be produced by purifying an effluent stream obtained from a 1-hexene production process, for example by distillation of the effluent stream obtained from a 1-hexene production process of the type disclosed in WIPO International Publication No. WO/2017/010998, which is incorporated by reference herein in its entirety, to obtain the composition.

In aspects, the $C_{10}$ monoolefins of any composition described herein can comprise, can consist essentially of, or can be, 2-butyl-1-hexene, 3-propyl-1-heptene, 4-ethyl-1-octene, and 5-methyl-1-nonene. In aspects, the $C_{10}$ monoolefins of any composition described herein can comprise i) at least about 20 mol %, alternatively at least about 22 mol %, alternatively at least about 24 mol %, alternatively at least about 26 mol %, alternatively at least about 28 mol %, or alternatively at least about 30 mol % 5-methyl- 1-nonene (represented by Structure 1), ii) at least about 8 mol %, alternatively at least about 9 mol %, alternatively at least about 10 mol %, alternatively at least about 11 mol %, alternatively at least about 12 mol %, or alternatively at least about 13 mol % 3-propyl-1-heptene (represented by Structure 2), iii) at least about 6 mol %, alternatively at least about 7 mol %, alternatively at least about 8 mol %, alternatively at least about 9 mol %, alternatively at least about 10 mol %, or alternatively at least about 11 mol % 4-ethyl-1-octene (represented by Structure 3), and iv) at least about 3 mol %, alternatively at least about 4 mol %, alternatively at least about 5 mol %, alternatively at least about 6 mol %, alternatively at least about 7 mol %, or alternatively at least about 8 mol % 2-butyl-1-hexene (represented by Structure 4).

In aspects, the $C_{10}$ monoolefins of any composition described herein can have a molar ratio of 2-butyl-1-hexene to 5-methyl-1-nonene of at least about 2:1, alternatively at least about 2.4:1, alternatively at least about 2.6:1, or alternatively at least about 2.8:1. In aspects, the $C_{10}$ monoolefins of any composition described herein can have a molar ratio of 3-propyl-1-heptene to 5-methyl-1-nonene of at least about 1.2:1, alternatively at least about 1.4:1, alternatively at least about 1.6:1, or alternatively at least about 1.8:1. In aspects, the $C_{10}$ monoolefins of any composition described herein can have a molar ratio of 4-ethyl-1-octene to 5-methyl-1-nonene of at least about 1.6:1, alternatively at least about 1.7:1, alternatively at least about 1.9:1, or alternatively at least about 2.1:1. In aspects, the $C_{10}$ monoolefins of any composition described herein can have a molar ratio of 2-butyl-1-hexene to 5-methyl-1-nonene of at least about 2:1, alternatively at least about 2.4:1, alternatively at least about 2.6:1, or alternatively at least about 2.8:1; a molar ratio of 3-propyl-1-heptene to 5-methyl-1-nonene of at least about 1.2:1, alternatively at least about 1.4:1, alternatively at least about 1.6:1, or alternatively at least about 1.8:1; and a molar ratio of 4-ethyl-1-octene to 5-methyl-1-nonene of at least about 1.6:1, alternatively at least about 1.7:1, alternatively at least about 1.9:1, or alternatively at least about 2.1:1.

In aspects, the $C_{10}$ monoolefins of any composition described herein can comprise linear $C_{10}$ monoolefins. In such embodiment, the linear $C_{10}$ monoolefins can comprise, can consist essentially of, or can be, 1-decene, 4-decene, 5-decene, or combinations thereof; alternatively, 1-decene; alternatively, 4-decene and/or 5-decene; alternatively, 4-decene; or alternatively, 5-decene. In aspects, the $C_{10}$ monoolefins of any composition described herein can comprise less than or equal to about 26 mol %, alternatively less than or equal to about 24 mol %, alternatively less than or equal to about 22 mol %, alternatively less than or equal to about 20 mol %, or alternatively less than or equal to about 18 mol % linear $C_{10}$ monoolefins. In aspects, the $C_{10}$ monoolefins of any composition described herein can comprise from about 1 mol % to about 16 mol %, alternatively from about 2 mol % to about 15 mol %, alternatively from about 3 mol % to about 14 mol %, alternatively from about 4 mol % to about 13 mol %, or alternatively from about 6 mol % to about 12 mol % 4-decene and/or 5-decene. In some embodiments, the $C_{10}$ monoolefins of any composition described herein can comprise less than or equal to about 10 mol %, alternatively less than or equal to about 9 mol %, alternatively less than or equal to about 8 mol %, alternatively less than or equal to about 7 mol %, or alternatively less than or equal to about 6 mol % 1-decene. In some aspects, the $C_{10}$ monoolefins of any composition described herein can comprise from about 0.5 mol % to about 9 mol %, alternatively from about 1 mol % to about 8 mol %, alternatively from about 1.5 mol % to about 7 mol %, or alternatively from about 2 mol % to about 6 mol % 1-decene.

In aspects, the composition disclosed herein can further comprise $C_{9-}$ monoolefins, $C_{11+}$ monoolefins, or combinations thereof; alternatively, $C_{9-}$ monoolefins; or alternatively, $C_{11+}$ monoolefins. In aspects, the $C_{9-}$ monoolefins can comprise, can consist essentially of, or can be, a $C_7$ monoolefin, a $C_8$ monoolefin, a $C_9$ monoolefin, or combinations thereof; alternatively, a $C_7$ monoolefin; alternatively, a $C_8$ monoolefin; or alternatively, a $C_9$ monoolefin. In some embodiments, the $C_{9-}$ monoolefins can comprise, can consist essentially of, or can be, a $C_8$ monoolefin. In aspects, the $C_{11+}$ monoolefins can comprise, can consist essentially of, or can be, a $C_{11}$ monoolefin, a $C_{12}$ monoolefin, a $C_{13}$ monoolefin, a $C_{14}$ monoolefin, a $C_{15}$ monoolefin, a $C_{16}$ monoolefin, a $C_{17}$ monoolefin, a $C_{18}$ monoolefin, or combinations thereof; alternatively, a $C_{11}$ monoolefin; alternatively, a $C_{12}$ monoolefin; alternatively, a $C_{13}$ monoolefin; alternatively, a $C_{14}$ monoolefin; alternatively, a $C_{15}$ monoolefin; alternatively, a $C_{16}$ monoolefin; alternatively, a $C_{17}$ monoolefin; or alternatively, a $C_{18}$ monoolefin. In some embodiments, the $C_{11+}$ monoolefins can comprise, can consist essentially of, or can be, a $C_{12}$ monoolefin, a $C_{16}$ monoolefin, a $C_{18}$ monoolefin, or combinations thereof; alternatively, a $C_{12}$ monoolefin; alternatively, a $C_{16}$ monoolefin; or alternatively, a $C_{18}$ monoolefin.

In aspects, the composition disclosed herein can further comprise $C_8$ monoolefins, $C_{12}$ monoolefins, $C_{16}$ monoolefins, $C_{18}$ monoolefins, or combinations thereof; alternatively, $C_8$ monoolefins; alternatively, $C_{12}$ monoolefins; alternatively, $C_{16}$ monoolefins and/or $C_{18}$ monoolefins; alternatively, $C_{16}$ monoolefins; or alternatively, $C_{18}$ monoolefins. In aspects, the Ca monoolefins can comprise 1-octene. In aspects, the $C_{12}$ monoolefins can comprise 1-dodecene.

In aspects, the composition can further comprise from about 0.1 mol % to about 5 mol %, alternatively from about 0.25 mol % to about 4 mol %, or alternatively from about 0.5 mol % to about 3 mol % $C_{12}$ monoolefins. In such embodiment, the $C_{12}$ monoolefins can comprise from about 54 mol % to about 74 mol %, alternatively from about 56 mol % to about 72 mol %, alternatively from about 58 mol % to about 70 mol %, or alternatively from about 60 mol % to about 68 mol % 1-dodecene.

In aspects, the composition can further comprise from about 0.1 mol % to about 5 mol %, alternatively from about 0.25 mol % to about 4 mol %, or alternatively from about 0.5 mol % to about 3 mol % $C_8$ monoolefins. In such embodiment, the Ca monoolefins can comprise at least about 95 mol %, alternatively at least about 96 mol %, alternatively at least about 97 mol %, alternatively at least about 98 mol %, or alternatively at least about 99 mol % 1-octene.

In aspects, the composition can further comprise from about 0.05 mol % to about 2 mol %, alternatively from about 0.04 mol % to about 1.5 mol %, alternatively from about 0.06 mol % to about 1.25 mol %, alternatively from about 0.08 mol % to about 1 mol %, or alternatively from about 0.1 mol % to about 0.75 mol % $C_{16}$ monoolefins and/or $C_{18}$ monoolefins.

In aspects, an effluent stream comprising branched $C_{10}$ monoolefins produced in a 1-hexene process can be purified to produce a branched $C_{10}$ monoolefin composition of the type described herein, for example to improve olefin reactivity and resultant dimer purity. A light fraction, comprising $C_9$-hydrocarbons can be removed from the effluent stream and any $C_{10}$ olefin isomers can be collected overhead to obtain a high purity (>95%) $C_{10}$ monoolefin fraction as the composition. This high purity $C_{10}$ monoolefin fraction (i.e., the composition) comprises little or no non-olefin impurities or $C_{11}$ to $C_{17}$ compounds. The high purity $C_{10}$ olefin can be reacted with a catalyst to produce the oligomer product (dimer product) disclosed herein. Reaction conditions to produce an oligomer product from the high purity $C_{10}$ monoolefin fraction (an embodiment of the composition) can be identical to the reaction conditions disclosed for embodiments of the composition comprising one or more branched $C_{10}$ monoolefins produced in a 1-hexene process that is used as received without further purification. The major difference between reacting a composition that is not a purified composition and a purified composition is the composition of the oligomer (dimer) product and any resulting hydrogenated products (the polyalphaolefin product).

Oligomerization (Dimerization) Conditions

Any suitable reactor or vessel can be used to perform the contacting step to form the oligomer product via oligomerization (e.g., dimerization) reactions. Non-limiting examples of a reactor or vessel can include a flow reactor, a continuous reactor, a packed tube, and a stirred tank reactor, including more than one reactor in series or in parallel, and including any combination of reactor types and arrangements.

The contacting step can be conducted at a variety of temperatures, pressures, and time periods. Contacting can generally include initial contact of one or more branched $C_{10}$ monoolefins with the catalyst, and continued contact during oligomerization. For instance, the temperature at which the one or more branched $C_{10}$ monoolefins and the catalyst are initially contacted can be the same as, or different from, the temperature at which the oligomer product is formed. As an illustrative example, in the contacting step, the one or more branched $C_{10}$ monoolefins and the catalyst can be contacted initially at temperature T1 and, after this initial combining, the temperature can be changed to a temperature T2 to allow for the oligomerization of the one or more branched $C_{10}$ monoolefins to form the oligomer product. Likewise, the pressure in the contacting step can be at pressure P1 for initial contact and P2 for oligomerizing the one or more branched $C_{10}$ monoolefins. The contact time can be referred to as the reaction time.

In aspects, the contacting step can be conducted at a minimum temperature of −60° C., −30° C., 0° C., 20° C., 50° C., 75° C., or 100° C.; or alternatively, at a maximum temperature of 80° C., 250° C., 230° C., 200° C., 175° C., 150° C., or 125° C. In aspects, the contacting step can be conducted at a temperature in a range from any minimum temperature disclosed herein to any maximum temperature disclosed herein. In some non-limiting embodiments, the contacting step can be conducted at a temperature in a range from −60° C. to 280° C.; alternatively, from −30° C. to 250° C.; alternatively, from 0° C. to 230° C.; alternatively, from 100° C. to 250° C.; alternatively, from 100° C. to 230° C.; alternatively, from 100° C. to 200° C.; alternatively, from 0° C. to 150° C.; alternatively, from 0° C. to 125° C.; or alternatively, from 20° C. to 100° C. These temperature ranges also are meant to encompass circumstances where the contacting step can be conducted at a series of different temperatures, instead of at a single fixed temperature, falling within the respective temperature ranges.

In aspects, the contacting step can be conducted at a minimum pressure of 10 psia (69 kPa), or 14.0 psia (97 kPa), 14.7 psia (101 kPa), or 20 psia (138); alternatively or additionally, the contacting step can be conducted at a maximum pressure of 1,000 psia (6.9 MPa), 500 psia (3.4 MPa), 400 psia (2.8 MPa), 300 psia (2 MPa), 200 psia (1.4 MPa), or 100 psia (689 kPa). In some non-limiting embodiments, the contacting step can be conducted at a pressure in a range from 10 psia (69 kPa) to 1,000 psia (6.9 MPa), from 10 psia (69 kPa) to 500 psia (3.4 MPa), from 14 psia (97 kPa) to 400 psia (2.8 MPa), from 14 psia (97 kPa) to 300 psia (3.4 MPa), from 14.7 psia (101 kPa) to 200 psia (1.4 MPa), or from 14.7 psia (101 kPa) to 100 psia (689 KPa).

In aspects, the contact time, or reaction time, can be a minimum time of 1 minute, 10 minutes, 30 minutes, 45 minutes, or 1 hour; alternatively or additionally, the contact time, or reaction time, can be a maximum time of 48 hours, 36 hours, 24 hours, 12 hours, 6 hours, 4 hours, or 2 hours. Ranges of reaction time which can be utilized in the contacting step can range from any minimum time described herein to any maximum time described herein. In some aspects, suitable ranges for the reaction time which can be utilized as dimerization conditions include, but are not limited to, from 1 minute to 48 hours, from 10 minutes to 36 hours, from 30 minutes to 24 hours, from 45 minutes to 24 hours, from 1 hour to 12 hours, from 1 hour to 6 hours or from 1 hour to 2 hours.

In aspects, the conversion of the one or more branched $C_{10}$ monoolefins is described as "monomer conversion" to indicate that the percentage conversion, in weight percent or in mole percent, is based on the one or more branched $C_{10}$ monoolefins and does not include non-monomer materials that can be present. In aspects, a minimum monomer conversion can be at least 10%, by weight percent or by mole percent. In another embodiment, the minimum monomer conversion can be at least 15%, at least 20%, at least 25%, at least 30%, at least 40%, or at least 50%, and these percentages can be weight percentages or mole percentages. In yet another embodiment, the maximum monomer conversion can be 90%, 85%, 80%, 75%, 70%, 65%, 60%, or 55%, and these percentages can be weight percentages or mole percentages. Generally, the monomer conversion can be in a range from any minimum monomer conversion disclosed herein to any maximum monomer conversion disclosed herein. Non-limiting ranges of monomer conversion, in weight or mole percentages, can include, but are not limited to, the following ranges: from 10% to 90%, from 10% to 85%, from 10% to 75%, from 15% to 90%, from 15% to 75%, from 10% to 60%, from 10% to 50%, from 15% to 50%, from 10% to 45%, from 15% to 45%, from 10% to 40%, or from 15% to 45%. Other monomer conversion ranges are readily apparent from this disclosure. In some embodiments, these monomer conversions can be achieved in a batch process, while in some aspects, these monomer conversions can be achieved in a flow or continuous process, such as, for example, a single pass thru a reactor (e.g., a fixed bed reactor).

Alkyl Aluminum Catalyst

In aspects, the catalyst employed in the oligomerization of one or more branched $C_{10}$ monoolefins can be an alkyl aluminum catalyst. In aspects, the alkyl aluminum catalyst can be a non-hydrolyzed alkyl aluminum compound.

Generally, each alkyl group of any alkyl aluminum catalyst described herein may independently be a $C_1$ to $C_{20}$ alkyl group; alternatively, a $C_1$ to $C_{10}$ alkyl group; or alternatively, a $C_1$ to $C_6$ alkyl group. In some embodiments, the alkyl group(s) may independently be a methyl group, an ethyl group, a propyl group, a butyl group, a pentyl group, a hexyl group, a heptyl group, or an octyl group; alternatively, a methyl group, an ethyl group, a butyl group, a hexyl group, or an octyl group. In some embodiments, the alkyl group may independently be a methyl group, an ethyl group, an n-propyl group, an n-butyl group, a t-butyl group, an iso-butyl group, a n-hexyl group, or an n-octyl group; alternatively, a methyl group, an ethyl group, a n-butyl group, an iso-butyl group, or an n-octyl group; alternatively, a methyl group; alternatively, an ethyl group; alternatively, an n-propyl group; alternatively, an n-butyl group; alternatively, an iso-butyl group; alternatively, an n-hexyl group; or alternatively, an n-octyl group. In several aspects, each aluminum atom in the alkyl aluminum catalyst is connected to three alkyl groups, wherein each alkyl group includes at least two carbon atoms. In several aspects, each aluminum atom in the alkyl aluminum catalyst is connected to three alkyl groups, wherein each alkyl group includes from 2 to 30; alternatively, 2 to 24; alternatively, 2 to 20; or alternatively, 2 to 10 carbon atoms.

In several aspects, the alkyl aluminum catalyst can comprise or can be selected from a trialkyl aluminum compound, a dialkyl aluminum halide compound, an alkyl aluminum dihalide compound, a dialkyl aluminum hydride compound, an alkyl aluminum dihydride compound, a dialkyl aluminum hydrocarbyloxide compound, an alkyl aluminum dihydrocarbyloxide compound, an alkyl aluminum sesquihalide compound, an alkyl aluminum sesquihydrocarbyloxide compound, or any combination thereof. Applicable alkyl groups and halides for the alkyl aluminum, alkyl aluminum halides, and/or alkyl aluminum hydrocarbyloxides are described herein and may be utilized to further describe the suitable alkyl aluminum compounds.

Exemplary trialkyl aluminum compounds may include but are not limited to, trimethyl aluminum (TMA), triethyl aluminum (TEA), tripropyl aluminum, tri-n-butyl aluminum, tri-isobutyl aluminum (TIBA), tri-n-octylaluminum (TNOA), or mixtures thereof. Exemplary alkyl aluminum halide compounds may include, but are not limited to, diethylaluminum chloride (DEAC), diethylaluminum bromide, ethylaluminum dichloride, ethylaluminum sesquichloride, and mixtures thereof. In various embodiments, the trialkyl aluminum compound may be triethyl aluminum (TEA), tri-isobutyl aluminum (TIBA), or tri-n-octylaluminum (TNOA).

In several aspects, the alkyl aluminum compound may be a mixture of a trialkyl aluminum compound and an alkyl aluminum halide. Generally, the trialkyl aluminum compound of the mixture may be any trialkyl aluminum compound described herein. The alkyl aluminum halide compound of the mixture may be any alkyl aluminum compound described herein. In some embodiments, the mixture of the trialkyl aluminum compound and the alkyl aluminum halide may comprise, or consist essentially of, triethyl aluminum and diethyl aluminum chloride, triethyl aluminum and ethyl aluminum dichloride, or triethyl aluminum and ethyl aluminum sesquichloride. In an embodiment, the alkyl aluminum compound may be a mixture of triethyl aluminum and diethyl aluminum chloride.

In aspects, the alkyl aluminum compound can comprise, or consist essentially of, a trialkyl aluminum compound. In an aspect, the trialkyl aluminum compound can comprise, or consist essentially of, trimethylaluminum, triethylaluminum (TEA), tripropylaluminum (e.g., tri-n-propylaluminum tri-2-propylaluminum, or combinations thereof), tributylaluminum (e.g., tri-n-butylaluminum, tri-2-butylaluminum, tri-t-butyl aluminum, tri-isobutylaluminum (TIBA), or combinations thereof), trihexylaluminum, tri-n-octylaluminum (TNOA), or combinations thereof.

In aspects, the alkyl aluminum catalyst is soluble in the reaction medium contained in the reactor or vessel that is used to perform the contacting step to form the oligomer product via oligomerization (e.g., dimerization) reactions. The alkyl aluminum catalyst can be fed to the reactor or vessel in a diluent or carrier, such as a solvent disclosed herein. Because the alkyl aluminum catalyst is soluble in the reaction medium, the alkyl aluminum catalyst can flow out of the reactor or vessel with the oligomer product. In such aspects, prior to separating the oligomer product into unreacted and product portions as disclosed herein, the catalyst can be quenched (e.g., via aqueous alkaline solution according to techniques known in the art with the aid of this disclosure) and/or removed from the oligomer product prior to recovering the $C_{20+}$ olefin portion from the oligomer product as is disclosed herein.

Additional Materials

Additional materials can be used in the contacting step. For instance, the formation of the oligomer product can occur in the presence of a non-olefin solvent. The amount of any non-olefin solvent used in addition to the disclosed internal olefins in the contacting step and/or the oligomerizing step of the process is not limited to any particular range. Such solvent, or combination of solvents, can be used, for example, as a flow modifier to alter the flow properties or viscosity of the one or more branched $C_{10}$ monoolefins and/or the flow properties of the oligomer product. Non-olefin solvents which can be utilized are described herein, and these solvents can be utilized without limitation in the oligomerization processes described herein.

Illustrative non-olefin organic solvents which can be utilized in the contacting step can include hydrocarbons, halogenated hydrocarbons, and combinations thereof. Hydrocarbon and halogenated hydrocarbon solvents can include, for example, aliphatic hydrocarbons, aromatic hydrocarbons, petroleum distillates, halogenated aliphatic hydrocarbons, halogenated aromatic hydrocarbons, or combinations thereof; alternatively, aliphatic hydrocarbons, aromatic hydrocarbons, halogenated aliphatic hydrocarbons, halogenated aromatic hydrocarbons, and combinations thereof; alternatively, aliphatic hydrocarbons; alternatively, aromatic hydrocarbons; alternatively, halogenated aliphatic hydrocarbons; or alternatively, halogenated aromatic hydrocarbons. Generally, suitable solvents include solvents that do not react with the monomers, internal olefins, alpha olefins, etc., disclosed herein.

Aliphatic hydrocarbons which can be useful in the contacting step include $C_3$ to $C_{20}$ aliphatic hydrocarbons; alternatively $C_4$ to $C_{15}$ aliphatic hydrocarbons; or alternatively, $C_5$ to $C_{10}$ aliphatic hydrocarbons. The aliphatic hydrocarbons can be cyclic or acyclic and/or can be linear or branched, unless otherwise specified.

Non-limiting examples of suitable acyclic aliphatic hydrocarbon solvents that can be utilized singly or in any combination include pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof; alternatively, pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof; hexane (n-hexane or a mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof; alternatively, pentane (n-pentane or a mixture of linear and branched $C_5$ acyclic aliphatic hydrocarbons); alternatively, hexane (n-hexane or mixture of linear and branched $C_6$ acyclic aliphatic hydrocarbons); alternatively, heptane (n-heptane or mixture of linear and branched $C_7$ acyclic aliphatic hydrocarbons); or alternatively, octane (n-octane or a mixture of linear and branched $C_8$ acyclic aliphatic hydrocarbons).

Non-limiting examples of suitable cyclic aliphatic hydrocarbon solvents include cyclohexane, methyl cyclohexane, and combinations thereof; alternatively cyclohexane; or alternatively, methylcyclohexane.

Aromatic hydrocarbons which can be useful as a solvent include $C_6$ to $C_{20}$ aromatic hydrocarbons; alternatively, $C_6$ to $C_{20}$ aromatic hydrocarbons; or alternatively, $C_6$ to $C_{10}$ aromatic hydrocarbons. Non-limiting examples of suitable aromatic hydrocarbons that can be utilized singly or in any combination include benzene, toluene, xylene (including ortho-xylene, meta-xylene, para-xylene, or mixtures thereof), and ethylbenzene, or combinations thereof; alternatively, benzene; alternatively, toluene; alternatively, xylene (including ortho-xylene, meta-xylene, para-xylene or mixtures thereof); or alternatively, ethylbenzene.

Halogenated aliphatic hydrocarbons which can be useful as a solvent include $C_2$ to $C_{15}$ halogenated aliphatic hydrocarbons; alternatively, $C_2$ to $C_{10}$ halogenated aliphatic hydrocarbons; or alternatively, $C_2$ to $C_5$ halogenated aliphatic hydrocarbons. The halogenated aliphatic hydrocarbons can be cyclic or acyclic and/or can be linear or branched, unless otherwise specified. Non-limiting examples of suitable halogenated aliphatic hydrocarbons which can be utilized include chloroform, carbon tetrachloride, dichloroethane, trichloroethane, and combinations thereof; alternatively, chloroform, dichloroethane, trichloroethane, and combinations thereof; alternatively, methylene chloride; alternatively, chloroform; alternatively, carbon tetrachloride; alternatively, dichloroethane; or alternatively, trichloroethane.

Halogenated aromatic hydrocarbons which can be useful as a solvent include $C_6$ to $C_{20}$ halogenated aromatic hydrocarbons; alternatively, $C_6$ to $C_{15}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof; alternatively, chlorobenzene; or alternatively, dichlorobenzene.

Oligomer Product Composition

The oligomer product generally contains unreacted branched $C_{10}$ monoolefins and a $C_{20+}$ olefin portion. The $C_{20+}$ olefin portion can include $C_{20}$ olefin dimers. The $C_{20+}$ olefin portion can additionally contain $C_{30+}$ oligomers (e.g., $C_{30}$ olefin trimers and $C_{40}$ olefin tetramers). The oligomers in the $C_{20+}$ olefin portion can include from about 95 wt % to about 99.9 wt % $C_{20}$ olefin dimers and from about 0.1 wt % to about 5 wt % other oligomers (e.g., $C_{30+}$ oligomers, for example, $C_{30}$ olefin trimers and $C_{40}$ olefin tetramers) based on a total weight of the $C_{20+}$ olefin portion. It has been found that the alkyl aluminum catalyst has a high selectivity to the olefin dimers of the components in the composition comprising branched $C_{10}$ monoolefins, in that, the $C_{20+}$ olefin portion can contain from about 95 wt % to about 99.9 wt % olefin dimers and only from about 0.1 wt % to about 5 wt % other oligomers (e.g., trimers, tetramers), without having to isolate the olefin dimers from the other oligomers to obtain this high dimer concentration in the $C_{20+}$ olefin portion. As such, the $C_{20+}$ olefin portion can be introduced directly to a hydrogenation process without having to further isolate the olefin dimers from the other oligomers.

In aspects, such as for oligomer reaction feedstock compositions having higher purity (>95 wt %) branched $C_{10}$ monoolefins, the oligomer product can include unreacted branched $C_{10}$ monoolefins, $C_{20}$ olefin dimers, and less than 1 wt % other oligomers (e.g., $C_{30+}$ oligomers). The alkyl aluminum catalyst has a high selectivity to the $C_{20}$ olefin dimers in the $C_{20+}$ olefin portion, in that, the $C_{20+}$ olefin portion can contain from about 95 wt % to about 99.9 wt % $C_{20}$ olefin dimers and only from about 0.1 wt % to about 5 wt % other oligomers (e.g., $C_{30+}$ oligomers), without having to isolate the $C_{20}$ olefin dimers from the other oligomers to obtain this high dimer concentration in the $C_{20+}$ olefin portion.

In aspects, the $C_{20}$ olefin dimers can include 2-(3-methylheptyl)-7-methyl-1-undecene, 2-(4-octyl)-7-methyl-1-undecene, 2-(3-methylheptyl)-5-propyl-1-nonene, 2-(2-ethylhexyl)-7-methyl-1-undecene, 2-(3-methylheptyl)-6-ethyl-1-decene, or combinations thereof.

In other aspects where the composition used for oligomerization is an unpurified $C_{10}$ feed containing $C_{10}$ monoolefins and $C_{14}$ monoolefins, the oligomerization (dimerization) can produce from about 95 wt % to about 99.9 wt % of a $C_{20}$ homodimer, $C_{28}$ homodimer, a $C_{24}$ heterodimer, or combinations thereof, and only from about 0.1 wt % to about 5 wt % other oligomers (e.g., trimers, tetramers), without having to isolate the dimers from the other oligomers to obtain this high dimer concentration in the $C_{20+}$ olefin portion. This dimer selectivity can apply regardless of the carbon number(s) of the monoolefins present in the composition in addition to the $C_{10}$ monoolefins, and various combinations of homodimers and/or heterodimers can be produced.

Separating Oligomer Product into Unreacted $C_{10}$ Portion and $C_{20+}$ Olefin Portion The process can further include separating the oligomer product into an unreacted $C_{10}$ portion comprising the unreacted $C_{10}$ monoolefins and the $C_{20+}$ olefin portion having from about 95 wt % to about 99.9 wt % $C_{20}$ olefin dimers based on a total weight of the $C_{20+}$ olefin portion. In aspects, the $C_{20+}$ olefin portion can further include from about 0.1 wt % to about 5 wt % other oligomers (e.g., $C_{30}$ olefin trimers and $C_{40}$ olefin tetramers) based on a total weight of the $C_{20+}$ olefin portion.

Examples of suitable separation techniques for separating the oligomer product can include distillation, fractionation, flashing, stripping, evaporation, or absorption. For example, in distillation, one or more distillation columns can contain trays, baffles, packing, or other structure(s) configured to perform distillation of the oligomer product such that the unreacted $C_{10}$ portion emits from the distillation column(s) in a vapor phase and the $C_{20+}$ olefin portion emits from the distillation column(s) in a liquid phase.

The unit operations/techniques used for the separating step, such as temperature, pressure, flow rates, and others conditions can be determined by one of ordinary skill in the art.

In aspects, the process can include recycling the unreacted $C_{10}$ portion to the oligomerization reactor where the one or more branched $C_{10}$ monoolefins are contacted with the catalyst to form the oligomer product as described herein.

Hydrogenating

The process can further include hydrogenating the $C_{20+}$ olefin portion to form polyalphaolefins comprising saturated $C_{20}$ hydrocarbons. Hydrogenation can be accomplished by any means known to those with ordinary skill in the art with the aid of this disclosure. In aspects, all or a portion of the oligomer product can be separated from the monomer. The separated $C_{20+}$ olefin portion (all or a portion of) can be fed to a hydrogenation unit configured to hydrogenate unsaturated double bonds of olefins in the $C_{20+}$ olefin portion and to produce a polyalphaolefin product comprising the polyalphaolefins. In aspects, the polyalphaolefins include the saturated $C_{30}$ hydrocarbons. In further aspects, the polyalphaolefins further include saturated $C_{30}$ hydrocarbons and saturated $C_{40}$ hydrocarbons.

Generally, hydrogenation can include contacting the $C_{20+}$ olefin portion (e.g., separated $C_{20+}$ olefin portion) and a hydrogenation catalyst to form a polyalphaolefin under conditions capable of hydrogenating the $C_{20+}$ olefin portion. In aspects, the hydrogenation catalyst can comprise, or consist essentially of, a supported Group 7, 8, 9, and 10 metals. In some aspects, the hydrogenation catalyst can be selected from the group consisting of one or more of Ni, Pd, Pt, Co, Rh, Fe, Ru, Os, Cr, Mo, and W, supported on silica, alumina, clay, titania, zirconia, or a mixed metal oxide supports. In other aspects, the hydrogenation catalyst can be nickel supported on kieselguhr, platinum or palladium supported on alumina, or cobalt-molybdenum supported on alumina; alternatively, nickel supported on kieselguhr; alternatively, platinum or palladium supported on alumina; or alternatively, cobalt-molybdenum supported on alumina. In yet other aspects, the hydrogenation catalyst can be one or more of the group consisting of nickel supported on kieselguhr, silica, alumina, clay or silica-alumina.

Generally, hydrogenation of the $C_{20+}$ olefin portion to form a polyalphaolefin can be performed in any type of process and/or reactor which can hydrogenate the $C_{20+}$ olefin portion to have a range of properties disclosed herein for the disclosed polyalphaolefins. In an aspect, the hydrogenation of the $C_{20+}$ olefin portion to form a polyalphaolefin can be performed in a batch process, a continuous process; or any combination thereof, alternatively a batch process; or alternatively a continuous process. In some aspects, the hydrogenation of the $C_{20+}$ olefin portion to form a polyalphaolefin can be performed in a slurry reactor, a continuous stirred tank reactor, a fixed bed reactor or any combination thereof; alternatively, a slurry reactor; alternatively, a continuous stirred tank reactor; or alternatively, a fixed bed reactor. Generally, the polyalphaolefin product can be filtered to separate the hydrogenation catalyst and/or catalyst fines from the polyalphaolefins. Further, the polyalphaolefins can be distilled to further purify the polyalphaolefin into polyalphaolefin fractions; alternatively, distilled to form two or more compositions comprising, or consisting essentially of, polyalphaolefins having different nominal viscosities; or alternatively, distilled to further purify the polyalphaolefins and form two or more compositions comprising, or consisting essentially of, polyalphaolefins having different nominal viscosities.

The quantity of hydrogenation catalyst utilized to hydrogenate the $C_{20+}$ olefin portion is dependent upon the identity of the hydrogenation catalyst and the particular hydrogenation process utilized. Generally, the amount of hydrogenation catalyst used can be any amount which can produce the desired polyalphaolefin product under the desired conditions capable of forming the polyalphaolefins. In a non-fixed bed hydrogenation process (e.g., slurry reactors or continuous stirred tank reactors, among others), the amount of hydrogenation catalyst used in the hydrogenation can range from 0.001 wt % to 20 wt %, 0.01 wt % to 15 wt %, 0.1 wt % to 10 wt %, or 1 wt % to 5 wt %. In a fixed bed process, the WHSV (weight hourly space velocity) of the $C_{20+}$ olefin portion over the hydrogenation catalyst can range from 0.01 to 10, 0.05 to 7.5, or 0.1 to 5. The wt % of the hydrogenation catalyst is based upon the total weight of the hydrogenation catalyst and the oligomer product (or portion of oligomer product) being subjected to hydrogenation.

Generally, the conditions capable of hydrogenating the $C_{20+}$ olefin portion can include a hydrogen pressure, a temperature, a contact time, or any combination thereof; alternatively, a hydrogen pressure and a temperature; alternatively, a hydrogen pressure, a temperature, and a contact time. In aspects, the temperature of the hydrogenation that can be utilized as a condition capable of hydrogenating the oligomer product can range from 25° C. to 350° C., from 50° C. to 300° C., from 60° C. to 250° C., or from 70° C. to 200° C. In aspects, the hydrogen pressure that can be utilized as a condition capable of hydrogenating the oligomer product can range from 100 kPa to 10 MPa, 250 kPa to 7 MPa, 500 kPa to 5 MPa, or 750 kPa to 2 MPa. In aspects, the contact time that can be utilized as a condition capable of hydrogenating the oligomer product can range from 1 minutes to 100 hours, from 2 minutes to 50 hours, 5 minutes to 25 hour, or 10 minute to 10 hours. Additional information on the hydrogenation of olefin oligomers (e.g., olefin oligomer such as those contained in the $C_{20+}$ olefin portion that can be produced by the processes described herein) to form polyalphaolefins can be found in U.S. Pat. No. 5,573,657 and "Lubricant Base Oil Hydrogen Refining Processes" (page 119 to 152 of Lubricant Base Oil and Wax Processing, by Avilino Sequeira, Jr., Marcel Dekker, Inc., NY (1994), each of which is incorporated by reference in its entirety.

PAO Products

In aspects, the polyalphaolefin product comprises polyalphaolefins. The polyalphaolefins include the saturated $C_{20}$ hydrocarbons. The saturated $C_{20}$ hydrocarbons can include 2-(3-methylheptyl)-7-methyl-1-undecane, 2-(4-octyl)-7-methyl-1-undecane, 2-(3-methylheptyl)-5-propyl-1-nonane, 2-(2-ethylhexyl)-7-methyl-1-undecane, 2-(3-methylheptyl)-6-ethyl-1-decane, or combinations thereof.

In aspects, the polyalphaolefin product can include from about 95 wt % to about 99.9 wt % of the saturated dimer hydrocarbons based on a total weight of the polyalphaolefin product. The concentration of about 95 wt % to about 99.9 wt % of the saturated dimer hydrocarbons can be obtained in the raw polyalphaolefin product, without any purification of the polyalphaolefin product. This is because of the high selectivity of the alkyl aluminum catalyst to the olefin dimers of all the monoolefins reacted in the oligomerization (dimerization) reaction that occurs prior to hydrogenation of the oligomer product. In aspects where a purified $C_{10}$ feed of $C_{10}$ monoolefins is used for dimerization, a concentration of about 95 wt % to about 99.9 wt % of the saturated $C_{20}$ hydrocarbons can be obtained in the raw polyalphaolefin product, without any purification of the polyalphaolefin product. This is because of the high selectivity of the alkyl aluminum catalyst to the $C_{20}$ olefin dimers in the oligomerization (dimerization) reaction that occurs prior to hydrogenation of the oligomer product.

In aspects, the polyalphaolefins produced by a process described herein can have a 100° C. kinematic viscosity from 1.0 cSt to 2.0 cSt; alternatively, from 1.1 cSt to 1.9 cSt; alternatively, from 1.3 cSt to 1.8 cSt; alternatively, from 1.5 cSt to 1.8 cSt. In some aspects, any polyalphaolefin produced by a process described herein can have a 100° C. kinematic viscosity of about 1.1, 1.2, 1.3, 1.4, 1.5, 1.6, 1.7, 1.8, 1.9, or 2.0 cSt, or any value between the foregoing list of values. Generally, the kinematic viscosity can be measured in accordance with ASTM D445 or ASTM D7042.

In aspects, the polyalphaolefins produced by a process described herein can have a 40° C. kinematic viscosity from 4.5 cSt to 7.0 cSt, or any value between the foregoing list of values. Generally, the kinematic viscosity can be measured in accordance with ASTM D445 or ASTM D7042.

In aspects, the polyalphaolefins produced by a process described herein can have a −40° C. kinematic viscosity in a range of from 275.0 cSt to 295.0 cSt; or any value between the foregoing ranges of values. Generally, the kinematic viscosity can be measured in accordance with ASTM D445 or ASTM D7042.

In aspects, the polyalphaolefins produced by a process described herein can have a 100° C. density from 0.700 g/mL to 0.800 g/mL; alternatively, from 0.710 g/mL to 0.790 g/mL; alternatively, from 0.720 g/mL to 0.780 g/mL; alternatively, from 0.730 g/mL to 0.770 g/mL; alternatively, from 0.740 g/mL to 0.760 g/mL; alternatively, from 0.740 g/mL to 0.750 g/mL. In some aspects, any polyalphaolefin produced by a process described herein can have a 100° C. density of 0.740, 0.741, 0.742, 0.743, 0.744, 0.745, 0.746, 0.747, 0.748, 0.749, or 0.750 g/mL, or any value between the foregoing list of values. Generally, the density can be measured in accordance with ASTM D7042.

In aspects, the polyalphaolefins produced by a process described herein can have a 40° C. density from 0.720 g/mL to 0.820 g/mL; alternatively, from 0.730 g/mL to 0.810 g/mL; alternatively, from 0.740 g/mL to 0.800 g/mL; alternatively, from 0.750 g/mL to 0.790 g/mL; alternatively, from 0.770 g/mL to 0.785 g/mL; alternatively, from 0.775 g/mL to 0.785 g/mL. In some aspects, any polyalphaolefin produced by a process described herein can have a 40° C. density of 0.775, 0.776, 0.777, 0.778, 0.779, 0.780, 0.781, 0.782, 0.783, 0.784, or 0.785 g/mL, or any value between the foregoing list of values. Generally, the density can be measured in accordance with ASTM D7042.

In aspects, the polyalphaolefins produced by a process described herein can have a 15° C. density from 0.750 g/mL to 0.850 g/mL; alternatively, from 0.760 g/mL to 0.840 g/mL; alternatively, from 0.770 g/mL to 0.830 g/mL; alternatively, from 0.780 g/mL to 0.820 g/mL; alternatively, from 0.790 g/mL to 0.810 g/mL; alternatively, from 0.795 g/mL to 0.805 g/mL. In some aspects, any polyalphaolefin produced by a process described herein can have a 15° C. density of 0.795, 0.796, 0.797, 0.798, 0.799, 0.800, 0.801, 0.802, 0.803, 0.804, or 0.805 g/mL, or any value between the foregoing list of values. Generally, the density can be measured in accordance with ASTM D7042.

In aspects, any polyalphaolefin produced by a process described herein can have a pour point less than or equal to −60° C., −65° C., −70° C., −75° C., −80° C., or −85° C. Any polyalphaolefin produced by a process described herein can have a pour point from −60° C. to −100° C.; alternatively, from −60° C. to −95° C.; alternatively, from −60° C. to −90° C.; alternatively, from −60° C. to −85° C.; alternatively, from −60° C. to −85° C. In some aspects, any polyalphaolefin produced by a process described herein can have a pour point of −60, −61, −62, −63, −64, −65, −66, −67, −68, −69, −70, −71, −72, −73, −74, −75, −76, −77, −78, −79, −80, −81, −82, −83, −84, or −85° C., or any value between the foregoing list of values. Generally, the pour point can be measured in accordance with ASTM D5950.

In aspects, any polyalphaolefin produced by a process described herein can have a flash point less than or equal to 200° C., 195° C., 190° C., 185° C., or 180° C. Any polyalphaolefin produced by a process described herein can have a flash point from 100° C. to 200° C.; alternatively, from 110° C. to 190° C.; alternatively, from 120° C. to 180° C.; alternatively, from 130° C. to 180° C.; alternatively, from 140° C. to 180° C.; alternatively, from 150° C. to 180° C., or any value between the foregoing list of values. Generally, the flash point can be measured in accordance with ASTM D92 (Cleveland Open Cup).

In aspects, any polyalphaolefin produced by a process described herein can have an autoignition temperature from 200° C. to 250° C.; alternatively, from 210° C. to 240° C.; alternatively, from 220° C. to 235° C.; alternatively, from 225° C. to 235° C. In aspects, any polyalphaolefin produced by a process described herein can have an autoignition temperature of 225, 226, 227, 228, 229, 230, 231, 232, 233, 234, or 235° C., or any value between the foregoing list of values. Generally, the autoignition temperature can be measured in accordance with ASTM E659 or D2155.

In aspects, any polyalphaolefin produced by a process described herein can have a thermal conductivity at 0° C. in a range of from 125.00 to 150.00 mW/(m·K); alternatively, from 130.00 to 150.00 mW/(m·K); alternatively, from 135.00 to 150.00 mW/(m·K), or any value between the foregoing list of values. Thermal conductivity is measured in accordance with ASTM D7896-19 or ASTM E1225.

In aspects, any polyalphaolefin produced by a process described herein can have a specific heat at 0° C. in a range of from 1850.0 to 2000.0 J/(kg·K); alternatively, 1850.0 to 1975.0 J/(kg·K), or any value between the foregoing list of values. Specific heat is measured in accordance with ASTM D7896-19 or ASTM E1269.

In aspects, the polyalphaolefins can have a kinematic viscosity at 100° C. in a range of from about 1.0 cSt to 2.0 cSt, a kinematic viscosity at 40° C. in a range of from about 4.5 cSt to 7.0 cSt, a kinematic viscosity at −40° C. in a range of from about 275.0 cSt to 295.0 cSt, a density at 100° C. in a range of from about 0.740 g/ml to about 0.750 g/ml, a density at 40° C. in a range of from about 0.775 g/ml to about 0.785 g/ml, a density at 15° C. in a range of from about 0.795 g/ml to about 0.805 g/ml, a pour point in a range of from about −60° C. to about −85° C., a flash point in a range of from about 150° C. to about 180° C., a thermal conductivity at 0° C. in a range of from about 130 to 150 mW/(m·K), a specific heat at 0° C. in a range of from about 1850 to 1975 J/(kg·K), or combinations thereof, wherein each property is measured in accordance with the standard(s) disclosed herein.

In an aspect, the polyalphaolefins described herein can be used in a variety of components or products for a diverse range of applications and industries. For example, the polyalphaolefins can be used as a lubrication fluid (or a component of a lubrication fluid). Exemplary lubrication fluids in which the polyalphaolefins produced by the processes described herein can be utilized include, but are not limited to, automotive lubricants, crank case lubricants, driveline lubrication fluids, gear lubricants, greases, gearbox oils, engine oils, transmission fluids, and/or drilling fluids. Exemplary functional fluids in which the polyalphaolefins produced by the processes described herein can be utilized include, but are not limited to, hydraulic fluids, drilling fluids, fracturing fluids, thermal management fluids, metal working fluids, coolant fluids, dielectric coolant fluids (e.g., for immersion cooling of electronic and/or computer devices).

Production of the Branched $C_{10}$ Monoolefins

The processes described herein also can include a 1-hexene production process for obtaining, producing, or otherwise forming the one or more branched $C_{10}$ monoolefins. The 1-hexene production process can include contacting 1) ethylene, 2) a catalyst system comprising i) a chromium containing compound, ii) a heteroatomic ligand, and iii) an alkyl aluminum compound, and 3) optionally a diluent to form an effluent stream comprising unreacted ethylene, 1-hexene, 1-octene, the one or more branched $C_{10}$ monoolefins, $C_{14}$ monoolefins, or combinations thereof. The process can further include separating the one or more branched $C_{10}$ monoolefins and the $C_{14}$ monoolefins from the effluent stream to form the composition that is feed to a reactor or vessel for oligomerization (e.g., dimerization) of the one or more branched $C_{10}$ monoolefins. In aspects, prior to separating the $C_{10}$ monoolefins and the $C_{14}$ monoolefins from the effluent stream, the process can include contacting the effluent stream with a catalyst system deactivating agent. These steps and more detail of the 1-hexene production process are described in WIPO International Publication No. WO/2017/010998, which is incorporated by reference herein in its entirety.

In aspects, the ethylene that is fed to the 1-hexene production process can be derived from cracking of hydrocarbons, or from ethanol. The ethanol can be derived from a biomass, a plastic (e.g., a waste plastic), a waste oil, a mixed solid waste stream, or a combination thereof.

In aspects, the diluent that is utilized in the 1-hexene production process can be any of the solvents disclosed herein.

Regarding the catalyst system, the chromium containing compound (of the catalyst systems disclosed herein) can have a chromium oxidation state of from 0 to 6, or from 2 to 3 (i.e., a chromium(II) compound or a chromium(III) compound). Non-limiting examples of chromium(II) compounds which can be used in the catalyst system disclosed herein can include chromium(II) nitrate, chromium(II) sulfate, chromium(II) fluoride, chromium(II) chloride, chromium(II) bromide, or chromium(II) iodide. Non-limiting examples of chromium(III) compounds which can be used in the catalyst systems disclosed herein can include chromium (III) nitrate, chromium(III) sulfate, chromium(III) fluoride, chromium(III) chloride, chromium(III) bromide, or chromium(III) iodide. In some embodiments, the catalyst system can comprise a chromium(II) alkoxide, a chromium(II) carboxylate, a chromium(II) beta-dionate, a chromium(III) alkoxide, a chromium(III) carboxylate, or a chromium(III) beta-dionate. In some embodiments, each carboxylate group of the chromium containing compound independently can be a $C_2$ to $C_{24}$ carboxylate group, alternatively, a $C_4$ to $C_{19}$ carboxylate group, or alternatively, a $C_5$ to $C_{12}$ carboxylate group. In some aspects, each alkoxy group of the chromium containing compound independently can be a $C_1$ to $C_{24}$ alkoxy group, alternatively, a $C_4$ to $C_{19}$ alkoxy group, or alternatively, a $C_5$ to $C_{12}$ alkoxy group. In yet some aspects, each aryloxy group of the chromium containing compound independently can be a $C_6$ to $C_{24}$ aryloxy group, alternatively, a $C_6$ to $C_{19}$ aryloxy group, or alternatively, a $C_6$ to $C_{12}$ aryloxy group. In still yet some aspects, each beta-dionate group of the chromium containing compound independently can be a $C_5$ to $C_{24}$ beta-dionate group, alternatively, a $C_5$ to $C_{19}$ beta-dionate group, or alternatively, a $C_5$ to $C_{12}$ beta-dionate group. Chromium carboxylates can be particularly useful for the catalyst systems disclosed herein. In an aspect, the catalyst systems disclosed herein can comprise a chromium carboxylate comprising a $C_2$ to $C_{24}$ monocarboxylate, alternatively, a $C_4$ to $C_{19}$ monocarboxylate, or alternatively, a $C_5$ to $C_{12}$ monocarboxylate.

In aspects, each carboxylate group of the chromium carboxylate independently can be an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate; or alternatively, a pentanoate, a hexanoate, a heptanoate, an octanoate, a nonanoate, a decanoate, an undecanoate, or a dodecanoate. In some embodiments, each carboxylate group of the chromium carboxylate independently can be acetate, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate); or alternatively, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, or laurate (n-dodecanoate).

In aspects, the chromium containing compound can comprise, can consist essentially of, or can be, a chromium(II) carboxylate or a chromium(III) carboxylate. In an embodiment, the chromium(II) carboxylates can comprise, can consist essentially of, or can be, chromium(II) acetate, chromium(II) propionate, chromium(II) butyrate, chromium (II) isobutyrate, chromium(II) neopentanoate, chromium(II) oxalate, chromium(II) octanoate, chromium(II) 2-ethylhexanoate, chromium(II) laurate, or chromium(II) stearate; or alternatively, chromium(II) acetate, chromium(II) propionate, chromium(II) butyrate, chromium(II) isobutyrate, chromium(II) neopentanoate, chromium(II) octanoate, chromium(II) 2-ethylhexanoate, chromium(II) laurate, or chromium(II) stearate. In an embodiment, the chromium(III) carboxylates can comprise, can consist essentially of, or can be, chromium(III) acetate, chromium(III) propionate, chromium(III) butyrate, chromium(III) isobutyrate, chromium (III) neopentanoate, chromium(III) oxalate, chromium(III) octanoate, chromium(III) 2-ethylhexanoate, chromium(III) 2,2,6,6,-tetramethylheptanedionate, chromium(III) naphthenate, chromium(III) laurate, or chromium(III) stearate.

In aspects, the heteroatomic ligand (whether it is a separate component of the catalyst system or is a ligand complexed to the chromium containing compound of the catalyst system) can comprise, can consist essentially of, or can be, an amine compound, an amide compound, an imide compound, or combinations thereof. In an embodiment, the heteroatomic ligand (whether it is a separate component of the catalyst system or is a ligand complexed to the chromium containing compound of the catalyst system) can comprise, can consist essentially of, or can be, a pyrrole compound, a diphosphino aminyl compound, an $N^2$-phosphinyl amidine compound, an $N^2$-phosphinyl formamidine compound, an $N^2$-phosphinyl guanidine compound, or combinations thereof. In some embodiments, the heteroatomic ligand (whether it is a separate component of the catalyst system or is a ligand complexed to the chromium containing compound of the catalyst system) can comprise, can consist essentially of, or can be, a pyrrole compound; alternatively, a diphosphino aminyl compound; alternatively, an $N^2$-phosphinyl amidine compound; alternatively, an $N^2$-phosphinyl formamidine compound; or alternatively, an $N^2$-phosphinyl guanidine compound.

In aspects, the amine compound can be a $C_2$ to $C_{30}$ amine; alternatively, a $C_2$ to $C_{20}$ amine; alternatively, $C_2$ to $C_{15}$ amine; or alternatively, a $C_2$ to $C_{10}$ amine. In an embodiment, the amide compound can be a $C_3$ to $C_{30}$ amide; alternatively, a $C_3$ to $C_{20}$ amide; alternatively, $C_3$ to $C_{15}$ amide; or alternatively, a $C_3$ to $C_{10}$ amide. In an embodiment, the imide compound can be a $C_4$ to $C_{30}$ imide; alternatively, a $C_4$ to $C_{20}$ imide; alternatively, $C_4$ to $C_{15}$ imide; or alternatively, a $C_4$ to $C_{10}$ imide.

In an aspect, the pyrrole compound (also called the "pyrrole") which can be utilized in the catalyst systems disclosed herein can comprise any pyrrole compound that can form a chromium pyrrolide complex. As used in this disclosure, the term "pyrrole compound" refers to pyrrole ($C_5H_5N$), derivatives of pyrrole (e.g., indole), substituted pyrroles, as well as metal pyrrolide compounds. A pyrrole compound is defined as a compound comprising a 5-membered, nitrogen-containing heterocycle, such as, for example, pyrrole, derivatives of pyrrole, or combinations thereof. Broadly, the pyrrole compound can be pyrrole or any heteroleptic or homoleptic metal complex or salt containing a pyrrolide radical or ligand. Generally, the pyrrole compound can be a $C_4$ to $C_{30}$ pyrrole; alternatively, a $C_4$ to $C_{20}$ pyrrole; alternatively, $C_4$ to $C_{15}$ pyrrole; or alternatively, a $C_4$ to $C_{10}$ pyrrole.

In aspects, the pyrrole compound which can be utilized in the catalyst systems disclosed herein can comprise, can consist essentially of, or can be, pyrrole, 2,5-dimethylpyrrole, 2-methyl-5-ethylpyrrole, 2-methyl-5-propylpyrrole, 2,5-diethylpyrrole, 3,4-dimethylpyrrole, 2,5-di-n-propylpyrrole, 2,5-di-n-butylpyrrole, 2,5-di-n-pentylpyrrole, 2,5-di-n-hexylpyrrole, 2,5-di-n-heptylpyrrole, 2,5-di-n-octylpyrrole, 2,5-dibenzylpyrrole, 2,4-dimethyl-3-ethylpyrrole, 2,3,5-triethylpyrrrole, 2,3,5-tri-n-butylpyrrrole, 2,3,5-tri-n-pentylpyrrrole, 2,3,5-tri-n-hexylpyrrrole, 2,3,5-tri-n-heptylpyrrrole, 2,3,5-tri-n-octylpyrrrole, 2,3,4,5-tetraethylpyrrole, 2,3,4,5-tetra-n-butylpyrrole, 2,3,4,5-tetra-n-hexylpyrrole, 2,5-bis(2',2',2'-trifluoroethyl) pyrrole, 2,5-bis(2'-methoxymethyl) pyrrole, 2-methyl-4-isopropylpyrrole, 2-ethyl-4-isopropylpyrrole, 2-methyl-4-sec-butylpyrrole, 2-ethyl-4-sec-butylpyrrole, 2-methyl-4-isobutylpyrrole, 2-ethyl-4-isobutylpyrrole, 2-methyl-4-t-butylpyrrole, 2-ethyl-4-t-butylpyrrole, 2-methyl-4-neo-pentylpyrrole, 2-ethyl-4-neopentylpyrrole, 3,4-diisopropylpyrrole, 3,4-di-sec-butylpyrrole, 3,4-diisobutylpyrrole, 3,4-di-t-butylpyrrole, 3,4-di-neo-pentylpropylpyrrole, tetrahydroindole, dipyrrolylmethane, indole, 3,4-dichloropyrrole, 2,3,4,5-tetrachloropyrrole, pyrrole-2-carboxylic acid, 2-acetylpyrrole, pyrrole-2-carboxaldehyde, 3-acetyl-2,4-dimethylpyrrole, ethyl-2,4-dimethyl-5-(ethoxycarbonyl)-3-pyrrole-propionate, or ethyl-3,5-dimethyl-2-pyrrolecarboxylate. In some embodiments, pyrrole compounds that can be used in the catalyst system disclosed herein comprise, but are not limited to pyrrole-2-carboxylic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-2,4-dimethyl-5-(ethoxycarbonyl)-3-pyrrole-propionate, ethyl-3,5-dimethyl-2-pyrrolecarboxylate, 3,4-dichloropyrrole, 2,3,4,5-tetrachloropyrrole, 2-acetylpyrrole, pyrazole, pyrrolidine, indole, dipyrrolylmethane, or combinations thereof. In some aspects, the pyrrole compound which can be utilized in the catalyst systems disclosed herein can comprise, can consist essentially of, or can be, pyrrole, 2,5-dimethylpyrrole, 2-methyl-5-ethylpyrrole, 2-methyl-5-propylpyrrole, 2,5-diethylpyrrole, or combinations thereof; alternatively, pyrrole; alternatively, 2,5-dimethylpyrrole; alternatively, 2-methyl-5-ethylpyrrole; alternatively, 2-methyl-5-propylpyrrole; or alternatively, 2,5-diethylpyrrole.

In aspects, the pyrrole compound which can be utilized in the catalyst systems disclosed herein can comprise a metal pyrrolide, such as an alkyl metal pyrrolide. In some embodiments, the pyrrole compound which can be utilized in the catalyst systems disclosed herein can comprise, individually or in any combination, a dialkyl aluminum pyrrolide of any pyrrole provided herein. Alkyl groups will be described in more detail later herein (e.g., as alkyl groups for the metal alkyl) and these alkyl groups can be utilized to further describe the alkyl metal pyrrolide and/or the dialkyl aluminum pyrrolide which can be utilized as the pyrrole compound which can be utilized in the catalyst systems disclosed herein. In some aspects, the pyrrole compound which can be utilized in the catalyst systems disclosed herein can comprise diethylaluminum 2,5-dimethylpyrrolide, ethylaluminum di(2,5-dimethylpyrrolide), aluminum tri (2,5-dimethylpyrrolide), or combinations thereof.

In aspects, the heteroatomic ligand can be a diphosphino aminyl compound. A diphosphino aminyl compound is a compound having a moiety characterized by having a P—N—P (phosphorus-nitrogen-phosphorus) linkage. For purposes of the disclosure herein, the moiety having the P—N—P linkage can hereafter be referred to as a "PNP moiety" or as a "diphosphino aminyl moiety." Further, for purposes of the disclosure herein, the heteroatomic ligand comprising the diphosphino aminyl moiety can be referred to as a "PNP ligand," a "diphosphino aminyl ligand," or a "diphosphino aminyl compound."

Any suitable reactor or vessel can be used to perform the 1-hexene production process. Non-limiting examples of a reactor or vessel can include a flow reactor, a continuous reactor, a packed tube, and a stirred tank reactor, including more than one reactor in series or in parallel, and including any combination of reactor types and arrangements.

In aspects, a temperature (e.g., a minimum temperature) at which 1-hexene and the one or more branched $C_{10}$ monoolefins can be formed in the 1-hexene production process can be at least 0° C.; alternatively, at least 10° C.; alternatively, at least 20° C.; alternatively, at least 30° C.; alternatively, at least 40° C.; alternatively, at least 50° C.; alternatively, at least 60° C.; alternatively, at least 70° C.; alternatively, at least 80° C.; alternatively, at least 90° C.; alternatively, at least 100° C.; alternatively, at least 110° C.; alternatively, at least 120° C.; alternatively, at least 130° C.; alternatively, at least 140° C.; alternatively, at least 150° C.; alternatively, at least 160° C.; alternatively, at least 170° C.; or alternatively, at least 180° C. In some embodiments, a temperature (e.g., maximum temperature) at which 1-hexene and the one or more branched $C_{10}$ monoolefins can be formed can be less than 180° C.; alternatively, less than 160° C.; alternatively, less than 140° C.; alternatively, less than 120° C.; alternatively, less than 100° C.; alternatively, less than 90° C.; or alternatively, less than 80° C. In some embodiments, the temperature at which the 1-hexene and the one or more branched $C_{10}$ monoolefins can be formed can range from any minimum temperature described herein to any maximum reaction temperature described herein as long as the maximum temperature is greater than the minimum temperature. In an embodiment, the temperature at which the 1-hexene and the one or more branched $C_{10}$ monoolefins can be formed can range from 0° C. to 180° C.; alternatively, from 10° C. to 160° C.; alternatively, from 20° C. to 140° C.; alternatively, from 30° C. to 120° C.; alternatively, from 40° C. to 100° C.; alternatively, from 50° C. to 100° C.; or alternatively, from 60° C. to 140° C. Other temperature ranges at which the 1-hexene and the one or more branched $C_{10}$ monoolefins can be formed can be understood by those skilled in the art with the help of this disclosure.

In an embodiment, the reactor(s) and/or vessel(s) in the 1-hexene production process can operate at any pressure that can facilitate the formation of 1-hexene and the one or more branched $C_{10}$ monoolefins. In an embodiment, the pressure can be any pressure that produces 1-hexene and the one or more branched $C_{10}$ monoolefins. In some embodiments, 1-hexene and the one or more branched $C_{10}$ monoolefins can be formed at a pressure greater than or equal to 0 psig (0 KPa); alternatively, greater than or equal to 50 psig (344 KPa); alternatively, greater than or equal to 100 psig (689 KPa); or alternatively, greater than or equal to 150 psig (1.0 MPa). In some aspects, the 1-hexene and the one or more branched $C_{10}$ monoolefins can be formed at a pressure ranging from 0 psig (0 KPa) to 2,500 psig (17.3 MPa); alternatively, from 0 psig (KPa) to 1,600 psig (11.0 MPa); alternatively, from 0 psig (KPa) to 1,500 psig (10.4 MPa); alternatively, from 50 psig (344 KPa) to 2,500 psig (17.3 MPa); alternatively, from 100 psig (689 KPa) to 2,500 psig (17.3 MPa); alternatively, from 150 psig (1.0 MPa) to 2,000 psig (13.8 MPa); or alternatively, from 300 psig (2.0 MPa) to 900 psig (6.2 MPa). In some embodiments, the ethylene pressure (or ethylene partial pressure) at which the 1-hexene and the one or more branched $C_{10}$ monoolefins can be formed can be greater than or equal to 0 psig (0 KPaf); alternatively, greater than or equal to 50 psig (344 KPa); alternatively, greater than or equal to 100 psig (689 KPa); or alternatively, greater than or equal to 150 psig (1.0 MPa). In some aspects, the ethylene pressure (or ethylene partial pressure) at which the 1-hexene and the one or more branched $C_{10}$ monoolefins can be formed can range from 0 psig (0 KPa) to 2,500 psig (17.3 MPa); alternatively, from 50 psig (344 KPa) to 2,500 psig (17.3 MPa); alternatively, from 100 psig (689 KPa) to 2,500 psig (17.3 MPa); or alternatively, from 150 psig (1.0 MPa) to 2,000 psig (13.8).

In an embodiment, a reaction time of the 1-hexene production process can comprise any time that can produce a desired quantity of 1-hexene and the one or more branched $C_{10}$ monoolefins; alternatively, any time that can provide a desired catalyst system productivity; or alternatively, any time that can provide a desired conversion of ethylene. For example, an ethylene conversion can be at least 30 wt % percent; alternatively, at least 35 wt % percent; alternatively, at least 40 wt % percent; or alternatively, at least 45 wt % percent.

In some aspects, the effluent stream of the 1-hexene production process can be treated and subjected to one or more separation processes to recover components from the effluent stream (e.g., unreacted ethylene, solvent, 1-hexene, the one or more branched $C_{10}$ monoolefins, among others).

Prior to recovery of 1-hexene and the one or more branched $C_{10}$ monoolefins from the effluent stream, the effluent stream can be contacted with a catalyst system deactivating and quench agent (alternatively, referred to herein as a "catalyst system kill agent") to deactivate and quench the active catalyst system (e.g., to form a deactivated and quenched effluent stream). In aspects, the effluent stream can be contacted with a catalyst system deactivating agent to at least partially deactivate the catalyst system and produce a deactivated catalyst system (e.g., to form a deactivated effluent stream, or alternatively a effluent stream containing a deactivated catalyst system); and then at least a portion of the effluent stream containing the deactivated catalyst system or deactivated catalyst system components can be contacted with a catalyst system quench agent to quench the catalyst system. The catalyst system deactivating and quench agent, catalyst system deactivating agent, and/or catalyst system quench agent can be independently selected from mono-alcohols, diols, polyols, or combinations thereof. In aspects, the catalyst system deactivating and quench agent, catalyst system deactivating agent, and/or catalyst system quench agent can comprise any mono-alcohol, diol, or polyol which is soluble in the effluent stream. The mono-alcohol, diol, or polyol can be selected by boiling point, molecular weight, and/or such that the mono-alcohol, diol, or polyol does not form an azeotrope with the oligomer(s), trimer, and/or tetramer (and/or diluent). In some embodiments, the mono-alcohol, diol, or polyol can have a boiling point different from the oligomer(s), trimer, and/or tetramer (and/or reaction system solvent) in the effluent stream. In aspects, the mono-alcohol can be a $C_4$ to $C_{30}$ mono-alcohol, alternatively, a $C_4$ to $C_{20}$ mono-alcohol, or alternatively, a $C_4$ to $C_{12}$ mono-alcohol. In some embodiments, the mono-alcohol can be selected to be easily removable from the 1-hexene and one or more branched $C_{10}$ monoolefins. Non-limiting examples of mono-alcohols suitable for use in the present disclosure include 1-hexanol, 2-hexanol, 3-hexanol, 2-ethyl-1-hexanol, 1-heptanol, 2-heptanol, 3-heptanol, 4-heptanol, 2-methyl-3-heptanol, 1-octanol, 2-octanol, 3-octanol, 4-octanol, 7-methyl-2-decanol, 1-decanol, 2-decanol, 3-decanol, 4-decanol, 5-decanol, 2-ethyl-1-decanol, or combinations thereof. In one or more specific embodiments, the mono-alcohol can comprise 2-ethyl-1-hexanol.

In aspects, the catalyst system deactivating and quench agent can be contacted with the effluent stream in an amount sufficient to deactivate the catalyst system (i.e., an amount that can inhibit, or halt: (1) production of undesirable solids, i.e., polymer; and/or (2) oligomer(s), trimer, and/or tetramer product purity degradation due to isomerization) in subsequent product separation processes and quench the catalyst system (i.e., an amount that can inhibit a pyrophoric nature of residual catalyst components). In these catalyst system deactivation and quench agent embodiments, the catalyst system deactivating and quench agent can be contacted with the effluent stream at an alcohol to metal of the metal alkyl compound (including metal alkyl compound which can be designated as a halogen containing compound) molar ratio (also referred to as an alcohol to metal molar ratio) of up to 100:1; alternatively, up to 50:1; alternatively, up to 25:1; alternatively, up to 10:1; alternatively, up to 5:1; alternatively, from 0.01:1 to 100:1; alternatively, from 0.1:1 to 50:1; alternatively, from 0.5:1 to 25:1; alternatively, from 0.75:1 to 5:1; alternatively, from 1:1 to 4:1; or alternatively, from 2:1 to 3:1. Catalyst system deactivation and quench processes are described in more detail in U.S. Pat. Nos. 5,689,028 and 8,344,198, among other documents.

In aspects, the effluent stream can be contacted with a catalyst system deactivation agent to at least partially deactivate the catalyst system; and later, a portion of the effluent stream containing at least a portion of the deactivated catalyst system (e.g., a portion of the effluent stream remaining after separating the oligomer, trimer, tetramer, and/or reaction system solvent from an effluent stream containing at least a portion of the at least partially deactivated catalyst system) can be contacted with the catalyst system quench agent to quench the catalyst system. In these catalyst system deactivating embodiments, the catalyst system deactivating agent can be contacted with the effluent stream at a catalyst deactivating agent to metal of the metal alkyl compound (including metal alkyl compound which can be designated as a halogen containing compound) molar ratio of from 0.75:1 to 1.25:1; alternatively, from 0.8:1 to 1.2:1; alternatively, from 0.85:1 to 1.15:1; or alternatively, about 1:1. In these embodiments, the catalyst system quench agent can be contacted with at least a portion of a stream containing at least a portion of the at least partially deactivated catalyst system at a catalyst system quench agent to metal of the metal alkyl compound (including metal alkyl compound which can be designated as a halogen containing compound) molar ratio of from 0.5:1 to 1.5:1; alternatively, from 0.7:1 to 1.2:1; alternatively, from 0.8:1 to 1.1:1; or alternatively, about 1:1. Additional information regarding a split catalyst system deactivation and catalyst system quench can be found in U.S. Pat. No. 8,049,052.

EXAMPLES

The following examples are illustrative of the dimerization of branched $C_{10}$ monoolefins to form an oligomer (dimer) product comprising $C_{20}$ olefin dimers followed by hydrogenation of the $C_{20}$ olefin dimers to produce saturated $C_{20}$ hydrocarbons in a polyalphaolefin (PAO) product.

Examples 1 and 2: Comparison of the PAO product formed when using different oligomerization (dimerization) catalysts for a purified $C_{10}$ feed of 100 wt % $C_{10}$ monoolefins.

Example 1 used a solid acid catalyst (i.e., the AMBERLYST® 15 resin), and Example 2 used an alkyl aluminum catalyst (i.e., tri-isobutyl aluminum (TIBA)). Table 1 below shows the product properties for the PAO products for Example 1 and Example 2. As can be seen in Table 1, the product properties using the TIBA catalyst were different compared to the properties of the product made from the AMBERLYST® 15 catalyst.

Example 3 used the same TIBA catalyst and the same reaction conditions as Example 2, and converted an unpurified $C_{10}$ feed of $C_{10}$ monoolefins with some $C_{12}$, $C_{14}$, and $C_{16}$ olefins present in the unpurified $C_{10}$ feed. The unpurified $C_{10}$ feed contained greater than 80 wt % $C_{10}$ monoolefins and approximately 1.7 wt % $C_{12}$ olefins, 7.2 wt % $C_{14}$ olefins, and 0.23 wt % $C_{18}$ olefins. As seen in Table 1, using the unpurified $C_{10}$ feed does result in a product with different PAO properties.

TABLE 1

| PAO Properties | Example 1 (AMBERLYST ® 15 + purified $C_{10}$ feed) | Example 2 (TIBA + purified $C_{10}$ feed) | Example 3 (TIBA + unpurified $C_{10}$ feed) |
|---|---|---|---|
| Viscosity Data (cSt) | | | |
| 100° C. | 2.11 | 1.7 | 1.91 |
| 40° C. | 8.6 | 5.0 | 6.7 |
| −40° C. | 2572 | 281 | N/A |
| Density (g/mL) | | | |
| 100° C. | 0.763 | 0.743 | N/A |
| 40° C. | 0.803 | 0.779 | N/A |
| 15° C. | 0.820 | 0.800 | 0.797 |
| Pour Point (° C.) | −71 | −82 | −62 |
| Flash Point (COC) (° C.) | 144 | 156 | N/A |
| Autoignition Temp. (° C.) | N/A | 230 | 227 |
| Thermal Conductivity, 0° C. | 128 | 137 | 147 |
| Specific Heat, 0° C. | 1697 | 1861 | 1968 |

It is noted that comparative experiments were also run with a boron trifluoride ($BF_3$) based catalyst as the oligomerization (dimerization) catalyst to produce a PAO product. Results are not reported herein because the $BF_3$-based catalyst made significantly more $C_{30}$ olefin trimers (up to 34 wt %) and less $C_{20}$ olefin dimer (only up to 60 wt %) in the $C_{20+}$ olefin portion of the oligomer product than did the solid acid catalyst and alkyl aluminum catalyst and was deemed unsuitable for selective production of $C_{20}$ olefin dimers from $C_{10}$ monoolefins to form a PAO product that is disclosed herein. Therefore, the experiments and properties of the PAO product resulting from $BF_3$-based catalyst used in the oligomerization step are not reported.

The FIGURE illustrates a gas chromatogram of the $C_{20}$ polyalphaolefin products of Example 1 and Example 2. In addition, Example 4 in the FIG. 1s the analysis of the product made using the $BF_3$ catalyst system. As can be seen, the GC confirms that different catalysts produce distinctly different oligomerization products. The FIGURE illustrates that the AMBERLYST® 15 resin results in a PAO product comprised of lower boiling point $C_{20}$ isomers. In comparison, the $BF_3$ catalyst results in a product comprising intermediate boiling point $C_{20}$ isomers, and the TIBA catalyst results in a product comprising higher boiling point $C_{20}$ isomers. The FIGURE clearly shows that the resulting $C_{20}$ product composition made by the TIBA catalyst is unexpectedly and surprisingly different from compositions made by other catalysts when using the branched $C_{10}$ feedstock. The use of TIBA catalyst may be desirable over other catalysts due to lower cost, ease of use, availability, and other factors.

ADDITIONAL DISCLOSURE

Accordingly, the scope of protection is not limited by the description set out above but is only limited by the claims which follow, that scope including all equivalents of the subject matter of the claims. Each and every claim is incorporated into the specification as part of the disclosure. Thus, the claims are a further description and are an addition to the detailed description. The disclosures of all patents, patent applications, and publications cited herein are hereby incorporated by reference.

Aspect 1. A process comprising: contacting a composition including one or more branched $C_{10}$ monoolefins with an alkyl aluminum catalyst to produce an oligomer product including unreacted $C_{10}$ monoolefins and $C_{20}$ olefin dimers, wherein the one or more branched $C_{10}$ monoolefins include 2-butyl-1-hexene, 3-propyl-1-heptene, 4-ethyl-1-octene, and 5-methyl-1-nonene; separating the oligomer product into an unreacted $C_{10}$ portion including the unreacted $C_{10}$ monoolefins and a $C_{20+}$ olefin portion including the $C_{20}$ olefin dimers; and hydrogenating the $C_{20+}$ olefin portion to form polyalphaolefins including saturated $C_{20}$ hydrocarbons.

Aspect 2. The process of Aspect 1, wherein the saturated $C_{20}$ hydrocarbons comprise 2-(3-methylheptyl)-7-methyl-1-undecane, 2-(4-octyl)-7-methyl-1-undecane, 2-(3-methylheptyl)-5-propyl-1-nonane, 2-(2-ethylhexyl)-7-methyl-1-undecane, 2-(3-methylheptyl)-6-ethyl-1-decane, or combinations thereof.

Aspect 3. The process of Aspect 1 or 2, wherein the $C_{20}$ olefin dimers comprise 2-(3-methylheptyl)-7-methyl-1-undecene, 2-(4-octyl)-7-methyl-1-undecene, 2-(3-methylheptyl)-5-propyl-1-nonene, 2-(2-ethylhexyl)-7-methyl-1-undecene, 2-(3-methylheptyl)-6-ethyl-1-decene, or combinations thereof.

Aspect 4. The process of any one of Aspects 1 to 3, wherein the polyalphaolefins have a kinematic viscosity at 100° C. in a range of from about 1.0 cSt to about 2.0 cSt, a kinematic viscosity at 40° C. in a range of from about 4.5 cSt to about 7.0 cSt, and a kinematic viscosity at −40° C. in a range of from about 275.0 cSt to about 295.0 cSt, when measured in accordance with ASTM D7042 or D445.

Aspect 5. The process of any one of Aspects 1 to 4, wherein the polyalphaolefins have a density at 100° C. in a range of from about 0.740 g/ml to about 0.750 g/ml, a density at 40° C. in a range of from about 0.795 g/ml to about 0.805 g/ml, and a density at 15° C. in a range of from about 0.795 g/ml to about 0.805 g/ml, when measured in accordance with ASTM D7042.

Aspect 6. The process of any one of Aspects 1 to 5, wherein the polyalphaolefins have a pour point in a range of from about −85° C. to about −60° C., when measured in accordance with ASTM D5950; and a flash point in a range of from about 150° C. to about 180° C., when measured in accordance with ASTM D92.

Aspect 7. The process of any one of Aspects 1 to 6, wherein the polyalphaolefins have a thermal conductivity at 0° C. in a range of from about 130 to 150 mW/(m*K), when measured in accordance with ASTM D7896-19 or ASTM E1225; and a specific heat at 0° C. in a range of from about 1850 to about 1975 J/(kg*K), when measured in accordance with ASTM D7896-19 or ASTM E1269.

Aspect 8. The process of any one of Aspects 1 to 7, wherein the $C_{20+}$ olefin portion comprises 95 wt % to 99.9 wt % $C_{20}$ olefin dimers based on a total weight of the $C_{20+}$ olefin portion.

Aspect 9. The process of any one of Aspects 1 to 8, wherein the $C_{20+}$ olefin portion further comprises less than 5 wt % $C_{30+}$ oligomers based on a total weight of the $C_{20+}$ olefin portion.

Aspect 10. The process of any one of Aspects 1 to 9, wherein the $C_{20+}$ olefin portion further comprises less than 1 wt % $C_{30+}$ oligomers based on a total weight of the $C_{20+}$ olefin portion.

Aspect 11. The process of any one of Aspects 1 to 10, wherein contacting is performed in an oligomerization reactor, the process further comprising: recycling the unreacted $C_{10}$ portion to the oligomerization reactor.

Aspect 12. The process of any one of Aspects 1 to 11, wherein the one or more branched $C_{10}$ monoolefins comprise i) at least 3 mol % 2-butyl-1-hexene, ii) at least 8 mol % 3-propyl-1-heptene, iii) at least 6 mol % 4-ethyl-1-octene, and iv) at least 20 mol % 5-methyl-1-nonene.

Aspect 13. The process of any one of Aspects 1 to 12, further comprising: contacting 1) ethylene, 2) a catalyst system comprising i) a chromium containing compound, ii) a heteroatomic ligand, and iii) an alkyl aluminum compound, and 3) optionally a diluent to form an effluent stream comprising unreacted ethylene, 1-hexene, 1-octene, the one or more branched $C_{10}$ monoolefins, $C_{14}$ monoolefins, or combinations thereof; and separating the one or more branched $C_{10}$ monoolefins and the $C_{14}$ monoolefins from the effluent stream to form the composition.

Aspect 14. The process of Aspect 13, wherein the ethylene is derived from ethanol, and wherein the ethanol is derived from a biomass, a plastic (e.g., a waste plastic), a waste oil, a mixed solid waste stream, or a combination thereof.

Aspect 15. A composition comprising polyalphaolefins, wherein the polyalphaolefins comprise 2-(3-methylheptyl)-7-methyl-1-undecane, 2-(4-octyl)-7-methyl-1-undecane, 2-(3-methylheptyl)-5-propyl-1-nonane, 2-(2-ethylhexyl)-7-methyl-1-undecane, 2-(3-methylheptyl)-6-ethyl-1-decane, or combinations thereof.

Aspect 16. The composition of Aspect 15, wherein the polyalphaolefins have a kinematic viscosity at 100° C. in a range of from about 1.0 cSt to about 2.0 cSt, a kinematic viscosity at 40° C. in a range of from about 4.5 cSt to about 7.0 cSt, and a kinematic viscosity at −40° C. in a range of from about 275.0 cSt to about 295.0 cSt, when measured in accordance with ASTM D7042 or ASTM D445.

Aspect 17. The composition of Aspect 15 or 16, wherein the polyalphaolefins have a density at 100° C. in a range of from about 0.740 g/ml to about 0.750, a density at 40° C. in a range of from about 0.775 g/ml to about 0.785 g/ml, and a density at 15° C. in a range of from about 0.795 g/ml to about 0.805 g/ml, when measured in accordance with ASTM D7042.

Aspect 18. The composition of any one of Aspects 15 to 17, wherein the polyalphaolefins have a pour point in a range of from about −85° C. to about −60° C., when measured in accordance with ASTM D5950; and a flash point in a range of from about 150° C. to about 180° C., when measured in accordance with ASTM D92.

Aspect 19. The composition of any one of Aspects 15 to 18, wherein the polyalphaolefins have a thermal conductivity at 0° C. in a range of from about 130 to 150 mW/(m*K), when measured in accordance with ASTM D7896-19 or ASTM E1225; and a specific heat at 0° C. in a range of from about 1850 to 1975 J/(kg*K), when measured in accordance with ASTM D7896-19 or ASTM E1269.

Aspect 20. The composition of any one of Aspects 15 to 19, comprising from about 99 wt % to about 99.9 wt % of the polyalphaolefins based on a total weight of the composition.

Aspect 21. A method of using a polyalphaolefin disclosed herein, wherein the method comprises using the polyalphaolefin as a thermal management fluid.

Aspect 22. A method of using a polyalphaolefin disclosed herein, wherein the method comprises using the polyalphaolefin as a metal working fluid.

Aspect 23. A method of using a polyalphaolefin disclosed herein, wherein the method comprises using the polyalphaolefin as a lubrication fluid.

Aspect 24. The method of Aspect 23, wherein the lubrication fluid is used as an automotive lubricant.

Aspect 25. The method of Aspect 23, wherein the lubrication fluid is used as a crank case lubrication fluid.

Aspect 26. The method of Aspect 23, wherein the lubrication fluid is used as a driveline lubrication fluid.

Aspect 27. The method of Aspect 23, wherein the lubrication fluid is used as a gear lubricant.

Aspect 28. A method of using a polyalphaolefin disclosed herein, wherein the method comprises using the polyalphaolefin as a hydraulic fluid.

Aspect 29. A method of using a polyalphaolefin disclosed herein, wherein the method comprises using the polyalphaolefin as a drilling and/or fracturing fluid.

Aspect 30. A method of using a polyalphaolefin disclosed herein, wherein the method comprises using the polyalphaolefin as a dielectric cooling fluid for immersion cooling of electronic and/or computer devices.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A process comprising:

contacting a composition comprising one or more branched $C_{10}$ monoolefins with an alkyl aluminum catalyst to produce an oligomer product comprising unreacted $C_{10}$ monoolefins and $C_{20}$ olefin dimers, wherein the one or more branched $C_{10}$ monoolefins comprise 2-butyl-1-hexene, 3-propyl-1-heptene, 4-ethyl-1-octene, and 5-methyl-1-nonene;

separating the oligomer product into an unreacted $C_{10}$ portion comprising the unreacted $C_{10}$ monoolefins and a $C_{20+}$ olefin portion comprising the $C_{20}$ olefin dimers; and hydrogenating the $C_{20+}$ olefin portion to form polyalphaolefins comprising saturated $C_{20}$ hydrocarbons, wherein the $C_{20+}$ olefin portion comprises 95 wt % to 99.9 wt % $C_{20}$ olefin dimers based on a total weight of the $C_{20+}$ olefin portion.

2. The process of claim 1, wherein the saturated $C_{20}$ hydrocarbons comprise 2-(3-methylheptyl)-7-methyl-1-undecane, 2-(4-octyl)-7-methyl-1-undecane, 2-(3-methylheptyl)-5-propyl-1-nonane, 2-(2-ethylhexyl)-7-methyl-1-undecane, 2-(3-methylheptyl)-6-ethyl-1-decane, or combinations thereof.

3. The process of claim 1, wherein the $C_{20}$ olefin dimers comprise 2-(3-methylheptyl)-7-methyl-1-undecene, 2-(4-octyl)-7-methyl-1-undecene, 2-(3-methylheptyl)-5-propyl-1-nonene, 2-(2-ethylhexyl)-7-methyl-1-undecene, 2-(3-methylheptyl)-6-ethyl-1-decene, or combinations thereof.

4. The process of claim 1, wherein the polyalphaolefins have a kinematic viscosity at 100° C. in a range of from about 1.0 cSt to about 2.0 cSt, a kinematic viscosity at 40° C. in a range of from about 4.5 cSt to about 7.0 cSt, and a kinematic viscosity at −40° C. in a range of from about 275.0 cSt to about 295.0 cSt, when measured in accordance with ASTM D7042 or D445.

5. The process of claim 4, wherein the polyalphaolefins have a density at 100° C. in a range of from about 0.740 g/ml to 0.750 g/ml, a density at 40° C. in a range of from about 0.775 g/ml to about 0.785 g/ml, and a density at 15° C. in a range of from about 0.795 g/ml to about 0.805 g/ml, when measured in accordance with ASTM D7042.

6. The process of claim 4, wherein the polyalphaolefins have a pour point in a range of from about −60° C. to −85° C., when measured in accordance with ASTM D5950; and a flash point in a range of from about 150° C. to about 180° C., when measured in accordance with ASTM D92.

7. The process of claim 4, wherein the polyalphaolefins have a thermal conductivity at 0° C. in a range of from about 130 to 150 mW/(m*K), when measured in accordance with ASTM D7896-19 or ASTM E1225; and a specific heat at 0° C. in a range of from about 1850 to 1975 J/(kg*K), when measured in accordance with ASTM D7896-19 or ASTM E1269.

8. The process of claim 1, wherein the $C_{20+}$ olefin portion further comprises less than 5 wt % $C_{30+}$ oligomers based on a total weight of the $C_{20+}$ olefin portion.

9. The process of claim 8, wherein the $C_{20+}$ olefin portion further comprises less than 1 wt % $C_{30+}$ oligomers based on a total weight of the $C_{20+}$ olefin portion.

10. The process of claim 1, wherein contacting is performed in an oligomerization reactor, the process further comprising:

recycling the unreacted $C_{10}$ portion to the oligomerization reactor.

11. The process of claim 1, wherein the one or more branched $C_{10}$ monoolefins comprise i) at least 3 mol % 2-butyl-1-hexene, ii) at least 8 mol % 3-propyl-1-heptene, iii) at least 6 mol % 4-ethyl-1-octene, and iv) at least 20 mol % 5-methyl-1-nonene.

12. A composition comprising from about 99 wt % to about 99.9 wt % polyalphaolefins based on a total weight of the composition, wherein the polyalphaolefins comprise 2-(3-methylheptyl)-7-methyl-1-undecane, 2-(4-octyl)-7-methyl-1-undecane, 2-(3-methylheptyl)-5-propyl-1-nonane, 2-(2-ethylhexyl)-7-methyl-1-undecane, 2-(3-methylheptyl)-6-ethyl-1-decane, or combinations thereof.

13. The composition of claim 12, wherein the polyalphaolefins have a kinematic viscosity at 100° C. in a range of from about 1.0 cSt to about 2.0 cSt, a kinematic viscosity at 40° C. in a range of from about 4.5 cSt to about 7.0 cSt, and a kinematic viscosity at −40° C. in a range of from about 275.0 cSt to about 295.0 cSt, when measured in accordance with ASTM D7042 or ASTM D445.

14. The composition of claim 13, wherein the polyalphaolefins have a density at 100° C. in a range of from about 0.740 g/ml to about 0.750 g/ml, a density at 40° C. in a range of from about 0.775 g/ml to about 0.785 g/ml, and a density at 15° C. in a range of from about 0.795 g/ml to about 0.805 g/ml, when measured in accordance with ASTM D7042.

15. The composition of claim 14, wherein the polyalphaolefins have a pour point of in a range of from about −80° C. to about −60° C., when measured in accordance with ASTM D5950; and a flash point in a range of from about 150° C. to 180° C., when measured in accordance with ASTM D92.

16. The composition of claim 14, wherein the polyalphaolefins have a thermal conductivity at 0° C. in a range of from about 130 to 150 mW/(m*K), when measured in accordance with ASTM D7896-19 or ASTM E1225; and a specific heat at 0° C. in a range of from about 1850 to 1975 J/(kg*K), when measured in accordance with ASTM D7896-19 ASTM E1269.

* * * * *